(12) United States Patent
Moore et al.

(10) Patent No.: US 10,068,031 B2
(45) Date of Patent: Sep. 4, 2018

(54) TABULAR DATA MANIPULATION SYSTEM AND METHOD

(71) Applicant: Clados Management LLC, San Mateo, CA (US)

(72) Inventors: Peter Moore, San Mateo, CA (US); Franz Christian Halaschek-Wiener, San Mateo, CA (US); Andrey Pleshakov, San Mateo, CA (US); Maxwell Bernardy, San Mateo, CA (US)

(73) Assignee: Bullet Point Network, L.P., San Mateo, CA (US)

( * ) Notice: Subject to any disclaimer, the term of this patent is extended or adjusted under 35 U.S.C. 154(b) by 230 days.

(21) Appl. No.: 14/203,472

(22) Filed: Mar. 10, 2014

(65) Prior Publication Data

US 2014/0279957 A1 Sep. 18, 2014

Related U.S. Application Data

(60) Provisional application No. 61/800,874, filed on Mar. 15, 2013.

(51) Int. Cl.
 G06F 17/30 (2006.01)

(52) U.S. Cl.
 CPC .. G06F 17/30958 (2013.01); G06F 17/30572 (2013.01)

(58) Field of Classification Search
 CPC ..................... G06F 17/30554; G06F 17/30958
 USPC .................................. 707/796, 797, 798, 805
 See application file for complete search history.

(56) References Cited

U.S. PATENT DOCUMENTS

| | | | | |
|---|---|---|---|---|
| 4,723,210 A * | 2/1988 | Barker | ................ | G06F 17/2229 715/210 |
| 4,723,211 A * | 2/1988 | Barker | .................. | G06F 17/211 715/210 |
| 5,168,441 A | 12/1992 | Onarheim et al. | | |
| 5,408,601 A * | 4/1995 | Nakamura | .......... | G06F 3/04845 715/808 |
| 5,414,809 A * | 5/1995 | Hogan | .................. | G06F 3/0481 345/440 |
| 6,625,499 B2 * | 9/2003 | Abdalla | .................. | G06F 17/24 700/25 |
| 6,920,608 B1 * | 7/2005 | Davis | .................. | G06F 17/2247 715/209 |
| 6,952,803 B1 * | 10/2005 | Bloomberg | ........... | G06F 17/211 382/186 |
| 7,475,365 B2 * | 1/2009 | Nan | ....................... | G06F 9/4443 707/999.01 |
| 7,546,286 B2 * | 6/2009 | Dickinson | ............. | G06F 17/246 |

(Continued)

FOREIGN PATENT DOCUMENTS

WO    WO 2006/113787    10/2006

OTHER PUBLICATIONS

PCT International Search Report of PCT/US14/23735; dated Mar. 27, 2015; (3 pgs.).

(Continued)

*Primary Examiner* — Frantz Coby
(74) *Attorney, Agent, or Firm* — DLA Piper LLP (US)

(57) ABSTRACT

A system and method that implements a tabular graph editor are disclosed. The system supports employing tables to browse and edit comparisons by multiple attributes of nodes in a graph.

32 Claims, 21 Drawing Sheets

(56) References Cited

U.S. PATENT DOCUMENTS

| | | | | |
|---|---|---|---|---|
| 7,823,087 | B2* | 10/2010 | Nan | G06F 9/4443 709/230 |
| 8,166,452 | B2 | 4/2012 | Kinnucan, Jr. et al. | |
| 2005/0160412 | A1 | 7/2005 | Thurner | |
| 2006/0037019 | A1 | 2/2006 | Austin et al. | |
| 2006/0059461 | A1* | 3/2006 | Baker | G06F 8/34 717/113 |
| 2007/0283238 | A1* | 12/2007 | Hecht | G06Q 30/02 715/205 |
| 2008/0189677 | A1 | 8/2008 | Cote et al. | |
| 2008/0195643 | A1* | 8/2008 | Sheth-Voss | G06F 17/3056 |
| 2009/0019353 | A1* | 1/2009 | Abrams | G06F 17/2247 715/224 |
| 2009/0303239 | A1* | 12/2009 | Ang | G06F 17/30554 345/440 |
| 2014/0279957 | A1* | 9/2014 | Moore | G06F 17/30958 707/692 |

OTHER PUBLICATIONS

PCT Written Opinion of the International Searching Authority of PCT/US14/23735; dated Mar. 27, 2015; (7 pgs.).

Prud'hommeaux, E. & Seaborne, A. (2007). *SPARQL Query Language for RDF: W3C Candidate Recommendation Jun. 14, 2007*; http://www.w3.org/TR/rdf-sparql-query/ (81 pages).

*The Neo4j Manual v2.0.1*, Copyright © 2014 Neo Technology. http://docs.neo4j.org/chunked/stable/cypher-query-lang.html (593 pages).

He, H., Singh, A. (2008). *Graphs-at-a-time: Query Language and Access Methods for Graph Databases*, Proceedings of the 2008 ACM SIGMOD International Conference on Management of Data (13 pages).

Klyne, G., Carroll, J. (2004). *Resource Description Framework (RDF): Concepts and Abstract Syntax, W3C Recommendation Feb. 10, 2004*; http://www.w3.org/TR/2004/REC-rdf-concepts-20040210/#dfn-property (18 pages).

Motik, B., et al., (2009), *OWL 2 Web Ontology Language Profiles: W3C Proposed Recommendation Oct. 27, 2009*; www.w3.org/TR/2009/REC-owl2-profiles-20091027/ (42 pages).

Harry, S & Seaborne, A. (2013); *SPARQL 1.1 Query Language ; W3C Recommendation Mar. 21, 2013*; http://www.w3.org/TR/sparql11-query/#propertypaths (90 pages).

Hearst, M. (2011). *Uls for Faceted Navigation: Recent Advances and Remaining Open Problems*. School of Information, UC Berkeley (5 pages).

Cao, L., Zhang, C., and Liu J. (1992). *Ontology-Based Integration of Business Intelligence*, University of Technology Sydney and Hong Kong Baptist University(13 pages).

Cohen, W., Borgida, A., and Hirsh, H., (1992). *Computing Least Common Subsumers in Description Logics*), Proceedings of the 10th National Conference on Artificial Intelligence (7 pages).

F. Baader, R. Kusters, and R. Molitor. *Computing least common subsumers in description logics with existential restrictions*. In Proc. of the 16th Int. Joint Conf. on Artificial Intelligence (IJCAI-99), pp. 96-101, 1999 (6 pages).

* cited by examiner

| is a | Transaction | | | |
|---|---|---|---|---|
| product | buyer | seller | time | revenue |
| Chip tester | Intel | Advantest | 2010 | $250M |
| CPU | Dell | Intel | 2011 | $8B |
| Notebook PC | Advantest | Dell | 2011 | $1M |

FIGURE 2

| is a | Transaction | | | |
|---|---|---|---|---|
| | | | revenue in grid | time |
| product | buyer | seller | 2010 | 2011 |
| Chip tester | Intel | Advantest | $250M | |
| MPU | Dell | Intel | | $8B |
| Notebook PC | Advantest | Dell | | $1M |

FIGURE 3

| is a | Transaction | | | |
|---|---|---|---|---|
| | | | revenue in grid | time |
| product | buyer | seller | 2010 | 2011 |
| +Asset | +Company | +Company | $250M | $8,001M |

FIGURE 4

| is a | | Transaction | | |
|---|---|---|---|---|
| | | | revenue in grid | time |
| product | buyer | seller | 2010 | 2011 |
| -Asset | +Company | +Company | $250M | $8,001M |
| -Device | +Company | +Company | $250M | $8,001M |
| -Electronic Device | +Company | +Company | $250M | $8,001M |
| +PC | Advantest | Dell | | $1M |
| +Semiconductor | Dell | Intel | | $8B |
| +Semiconductor manufacturing equipment | Intel | Advantest | $250M | |

FIGURE 5

| is a | | Transaction | | |
|---|---|---|---|---|
| | | | revenue in grid | time |
| product | buyer | seller | 2010 | 2011 |
| -Asset | +Company | +Company | $250M | $8,001M |
| -Device | +Company | +Company | $250M | $8,001M |
| -Electronic device | -Company | +Company | $250M | $8,001M |
| | Advantest | Dell | | $1M |
| | Dell | Intel | | $8B |
| | Intel | Advantest | $250M | |
| +PC | Advantest | Dell | | $1M |
| +Semiconductor | Dell | Intel | | $8B |
| +Semiconductor manufacturing equipment | Intel | Advantest | $250M | |

FIGURE 6

| is a | Transaction | | | |
|---|---|---|---|---|
| product | buyer | seller | time | revenue |
| Notebook PC | Genentech | Dell | 2011 | $6M |

FIGURE 7

| is a | Transaction | | | |
|---|---|---|---|---|
| product:made with | buyer | seller | time | revenue |
| Chip tester | Advantest | Dell | 2011 | $1M |
| | Dell | Intel | 2011 | $8B |
| | Intel | Advantest | 2010 | $250M |
| CPU | Advantest | Dell | 2011 | $1M |
| | Dell | Intel | 2011 | $8B |
| Notebook PC | Advantest | Dell | 2011 | $1M |

FIGURE 8

| is a | Transaction | | | |
|---|---|---|---|---|
| product:made with | buyer | seller | time | revenue |
| CPU | Amgen | Dell | 2011 | $7M |

FIGURE 9

| is a | Transaction | | | |
|---|---|---|---|---|
| product | buyer | seller | time | revenue |
| Chip tester | Intel | Advantest | 2010 | $250M |

FIGURE 10

| is a | Transaction | | | |
|---|---|---|---|---|
| product | buyer | seller | time | revenue |
| CPU | Dell | Intel | 2011 | $8B |

| product | buyer | seller | time | 2010 | 2011 |
|---|---|---|---|---|---|
| Electronic device | Company | Company | revenue | 250 | 3,001 |

FIGURE 21

| product | buyer | seller | time | 2010 | 2011 |
|---|---|---|---|---|---|
| Electronic device | Company | Company | revenue | 250 | 3,001 |
| Chip tester | Intel | Advantest | revenue | 250 | |
| CPU | Dell | Intel | revenue | | 3,000 |
| Notebook PC | Advantest | Dell | revenue | | 1 |

FIGURE 22
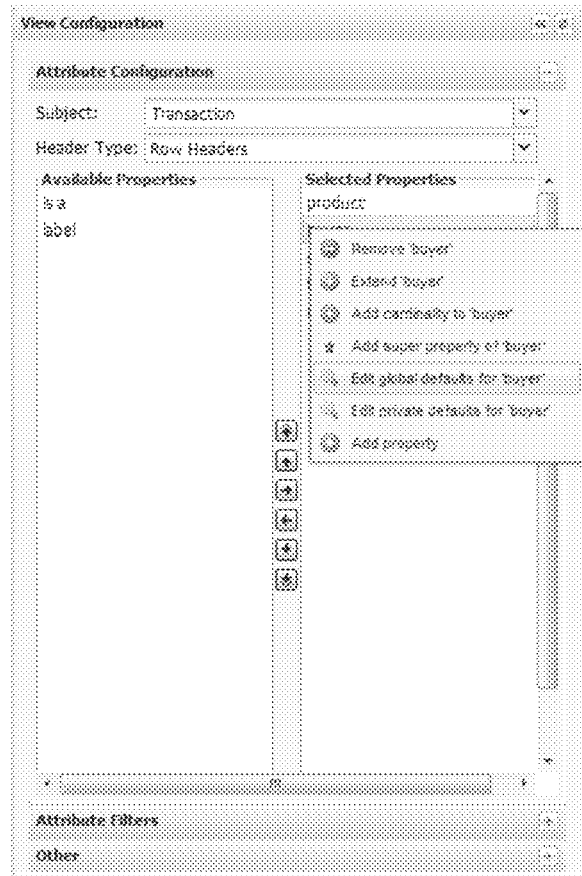
FIGURE 23
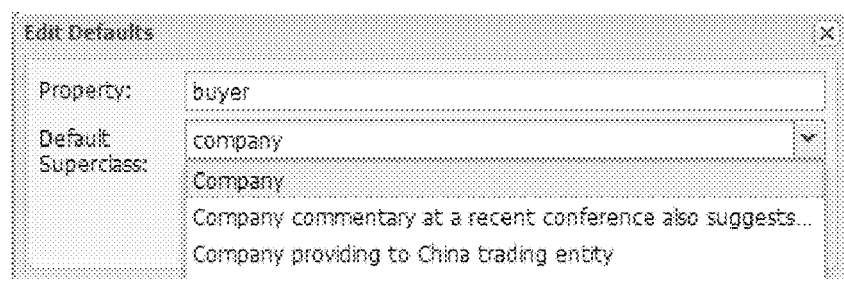
FIGURE 24

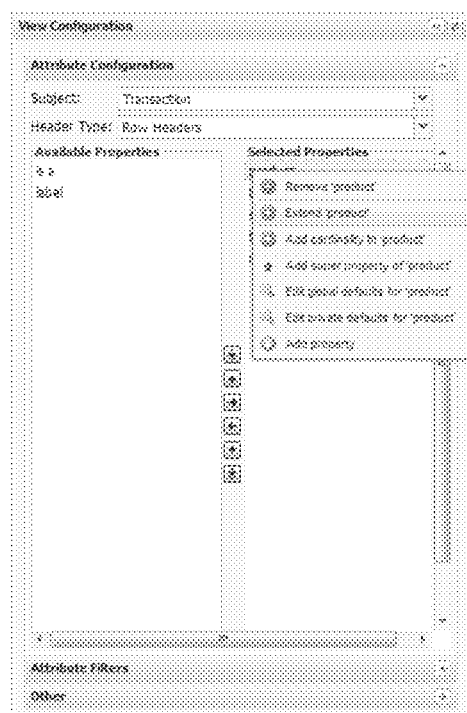
FIGURE 25
FIGURE 26
| product made with | buyer | seller | time | revenue |
|---|---|---|---|---|
| Cho tester | Advantest | Dell | 2011 | 1 |
| | Dell | Intel | 2011 | 8,000 |
| | Intel | Advantest | 2010 | 250 |
| CPU | Advantest | Dell | 2011 | 1 |
| | Dell | Intel | 2011 | 8,000 |
| Notebook PC | Advantest | Dell | 2011 | 1 |
FIGURE 27

User input: table having each column corresponding to the property chain

Goal: allow user to utilize existing resources for missing columns based on specified column values Column <A>:<B> is called "missing" from the table if there are columns <A> and <A>:<B>:<C> in the table where <B> and <C> are an arbitrary property chains having length > 0.

2902

| # | Base (label) | Prop 1 | Prop 2 Prop 4 | Prop 2 Prop 3 Prop 5 | Prop 2 Prop 3 Prop 5 Prop 7 | Prop 2 Prop 3 Prop 7 | Prop 2 Prop 4 Prop 8 | Prop 2 Prop 3 Prop 5 Prop 9 |
|---|---|---|---|---|---|---|---|---|
| 1 | R1 | | R2 | | R3 | L1 | R2 | L2 |

There are missing columns for attributes having properties
1. Prop 2 : Prop 3
2. Prop 2 : Prop 3 : Prop 5

2904 ——————————— Triple-based representation

Missing column results in Unspecified #

| # | Subject | Predicate | Object |
|---|---|---|---|
| | R1 | Prop 2 | R2 |
| | R2 | Prop 3 | Unspecified 1 |
| | Unspecified 1 | Prop 5 | Unspecified 2 |
| | Unspecified 1 | Prop 6 | L1 |
| | Unspecified 2 | Prop 8 | R2 |
| | R2 | Prop 9 | L2 |

← 2806

Blank cell value of existing column results in restriction

| # | Subject | Predicate | Object |
|---|---|---|---|
| | R1 | Prop 1 | * |
| | R2 | Prop 4 | * |
| | Unspecified 1 | Prop 7 | * |
| | * | Prop 8 | R3 |

Base resource is considered as the root. Restrictions result in the node "*". If base is not specified it is considered as a missing column with a property path of length 0. This representation allows to have more than one path per node and is implemented as a map (path -> value).

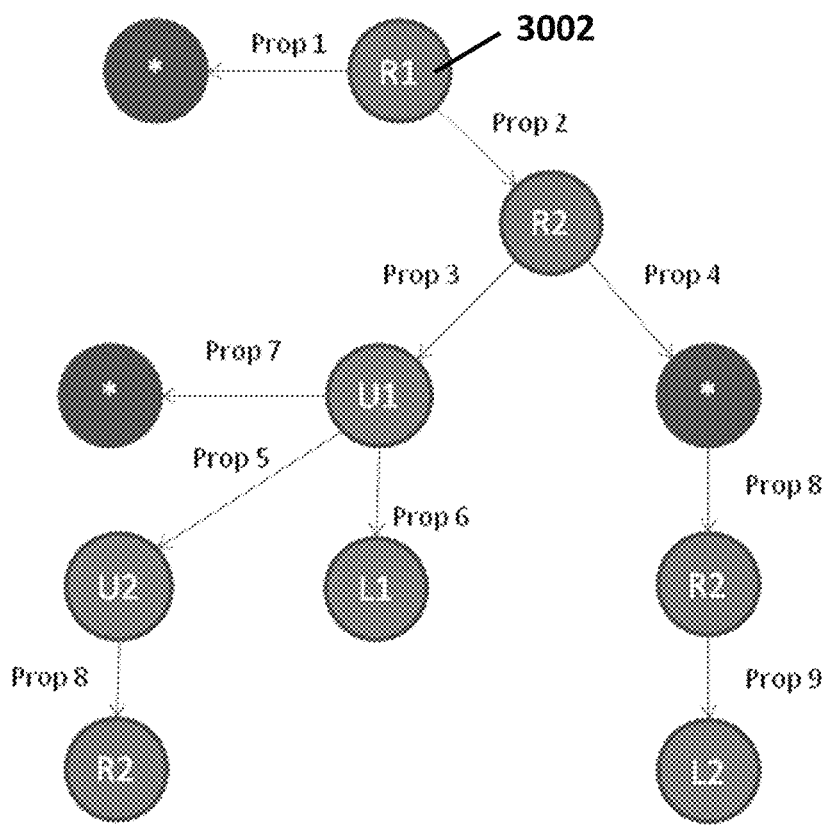

In the following text the "level of the node N in the tree T" is the minimal possible height of the sub-tree S of T if S contains N.

"Attributes of the node N" is a set of pairs (outgoing arc of N, node). Node N "has attribute M" if there is attribute pair (<any outgoing arc of N>, M) in the attributes of N. For example, node R2 has attributes {(Prop 9, L2), (Prop 4, *), (Prop 3, U1)}

FIGURE 30

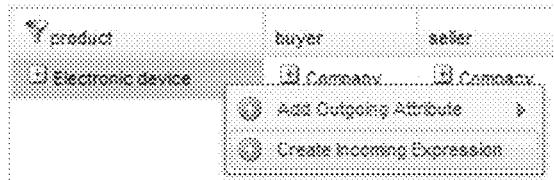
FIGURE 32
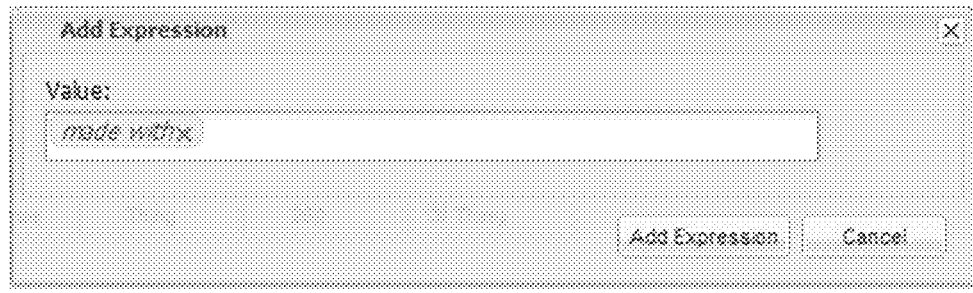
FIGURE 33
FIGURE 34
FIGURE 35
FIGURE 36

TABULAR DATA MANIPULATION SYSTEM AND METHOD

PRIORITY CLAIMS/RELATED APPLICATIONS

This application claims the benefit of and priority to under 35 USC §§ 119(e) and 120 to U.S. Provisional Patent Application Ser. No. 61/800,874 filed on Mar. 15, 2013 and entitled "Tabular Manipulation Of Higher Arity And Cardinality In Graphs And Ontologies", the entirety of which is incorporated herein by reference.

FIELD

The disclosure relates generally to data manipulation system and method and in particular tabular graph editor system and method.

BACKGROUND

Relational databases work well for processing transactions, using the query language SQL to pull together data from columns in multiple separate tables full of transaction numbers. But they do not work well for pulling together "nodes" from a network of "edges", like Facebook's Social Graph. That task requires "many-to-many joins", which require creating "junction tables", and it requires writing SQL queries that are recursive across these junction tables, making these queries complex to write and slow to execute.

A "graph database" is a kind of "NoSQL" database that uses a graph query language, like the World Wide Web Consortium ("W3C") standard SPARQL (described in Prud'hommeaux, E. & Seaborne, A. (2007). SPARQL Query Language for RDF: W3C Candidate Recommendation 14 Jun. 2007. Available at http://www.w3.org/TR/rdf-sparql-query/) or the proprietary Cypher (described in De Marzi, M. (2012). Cypher Query Language. Chicago Graph Database Meet-Up) or GraphQL (described in He, H., Singh, A. (2008). Graphs-at-a-time: query language and access methods for graph databases. Proceedings of the 2008 ACM SIGMOD international conference on management of data), to traverse edges without junction tables or recursivity, enabling queries that are simple and fast for data structured as a "graph," such as the one depicted in FIG. 1 as a visualization of nodes in black and edges in color.

The graph structure enables queries to traverse multiple edges in a graph to compile groups of related nodes, such as the Transactions whose product is an Electronic device. If a graph is structured more formally as an "ontology," then it can also enable "logical inference," wherein relationship assertions, such as "Notebook PC is a PC" and "PC made with CPU," enable the system to logically infer additional relationships, such as "Notebook PC made with CPU." Then if a user changes the assertion that a computer is made with a CPU, for example, the system can automatically change the inference that a notebook PC is made with a CPU. This reduces redundant effort, which can be useful for maintaining a graph over time as the relationships between its nodes change.

Graph database adoption accelerated in 2011 as the ecosystem finally became stable and scalable, and as "Big Data" and "NoSQL" became technology industry buzzwords. Graph database producers include Aduna, Clark & Parsia, Cray, Franz, Kobrix, Neo Technology, Objectivity, Ontotext, Oracle, sones, and SYSTAP, among others.

But as these firms' customers migrate their data into a graph structure, they are struggling to explore it and edit it, despite the proliferation of tools to visualize graphs as nodes and edges. FIG. 1's visualization of nodes and edges, for example, makes it impractical to compare attributes of its nodes, such as to compare Transactions' revenue by product, time, buyer, and seller.

It turns out that for viewing comparisons of nodes by multiple attributes, such as by the products, times, and companies described for the "Transactions" in this graph, tables still have advantages over visualizations of nodes and edges even when data is structured as a graph. And it turns out that viewing graph-structured data in tables presents a host of challenges.

To describe these advantages and challenges, we will describe graphs using the W3C standard Resource Description Framework ("RDF") (described in Carrol, J. & Klein, G. (2004). Resource Description Framework (RDF), Concepts and Abstract Syntax: W3C Candidate Recommendation 10 Feb. 2004. Available at http://www.w3.org/TR/2004/REC-rdf-concepts-20040210/#dfn-property) terminology, referring to each link in a graph as a "triple" with three parts: a "subject" node, an "object" node, and a "predicate" linking the subject and object. For example, in the link "PC made with CPU" in the graph in FIG. 1, "PC" is the subject, "made with" is the predicate, and "CPU" is the object. Alternative terms for predicate include "arc", "edge", "line", "link", and others. Alternative terms for subject and object include "node", "point", "vertex", and others.

For each node, we refer to as "attribute" the predicate and object of each triple whose subject is that node, so for a node like "Intel buys $250M of chip testers from Advantest in 2010" in the graph in FIG. 1, we describe its attributes as "is a Transaction", "time 2022", "seller Advantest", "product Chip tester", "buyer Intel", and "revenue $250M". In some contexts, others describe an attribute by using the term "property".

But consistent with RDF, we use the term "property" to refer to the kind of relationship represented by each predicate. For example, the subsumption relation in set theory may be represented by a property called "is a", and the parthood relation in mereology may be represented by a property called "made with", so in the graph in FIG. 1, the two predicates in the two triples "Computer made with CPU" and "Semiconductor made with Chip tester" are both instances of one property called "made with".

If one supplements a graph with a formal vocabulary, such as supplementing RDF with the W3C standard OWL2 Web Ontology Language ("OWL2") (described in Motik, B. et. al. (2009). OWL2 Web Ontology Language Profiles: W3C Proposed Recommendation 27 Oct. 2009. Available at http://www.w3.org/TR/2009/REC-owl2-profiles-20091027/), then the graph becomes a kind of graph termed an "ontology", and certain properties like the subsumption relation enable one to "infer" additional information without stating it in the graph. For example, in the graph in FIG. 1, one can infer that "Notebook PC" has the attribute "made with CPU" because it has the attribute "is a PC" and "PC" has the attribute "made with CPU". If one uses the formal vocabulary to describe the "made with" property as "transitive", then one can traverse the graph, combining successive predicates in that property to infer that "Notebook PC" also has the attribute "made with Chip tester". And if one describes the "made with" property as "reflexive", then it will relate every node to itself, and one can infer that "Notebook PC" also has the attribute "made with Notebook PC".

We refer to "property path" to specify a combination of different properties that may connect nodes in a graph transitively across more than one triple, and we use a colon to separate properties in a property path. For example, in the graph in FIG. 1, if the property "is a" is transitive, then the property path "product:is a" connects all three Transactions as subjects to "Asset" as object. Extensions to the SPARQL graph query language have been proposed to support queries across not only properties but also property paths, and some graph database producers have implemented these extensions (described in Harry, S. & Seaborne, A. (2012). SPARQL 1.1 Query Language: W3C Proposed Recommendation 8 Nov. 2012. Available at http://www.w3.org/TR/sparql111-query/#propertypaths).

We refer to "cardinality" of a property for a given node to describe the number of attributes that node has with that same property. In the graph in FIG. 1, the node "PC" has cardinality 2 in the "made with" property. We refer to cardinality above 1 as "higher cardinality".

We refer to "arity" to describe the number of different nodes in a relationship. A triple describes a relationship between 2 nodes, so it has arity of 2 and can be described as a "binary relationship." But one may wish to examine a relationship between more than 2 nodes, such as between the 4 nodes "2010", "Advantest", "Intel", and "$250M" in the graph in FIG. 1, because these nodes are the objects of the attributes of "Intel buys $250M of chip testers from Advantest in 2010". We refer to relationships between more than 2 nodes as "higher-arity relationships". These higher-arity relationships can be useful for making comparisons, but they are difficult to manipulate in a visualization of nodes and edges.

Tables can be useful for manipulating higher-arity relationships. For example, some higher-arity relationships in the graph in FIG. 1 can each be represented as a row in a table that uses 1 page header and more than 2 row headers, as shown in FIG. 2.

The same higher-arity relationships can each be represented as a grid cell in a table that uses 1 page header and more than 2 row headers and column headers, as shown in FIG. 3.

The same higher-arity relationships can be summarized further in a table's grid area by performing an OLAP roll-up operation based on the "is a" property, as shown in FIG. 4.

Prior art for using tables to manipulate higher-arity relationships in graph-structured data includes designs for browsing these relationships by using "faceted navigation" (described in Hearst, M. (2011) UIs for Faceted Navigation: Recent Advances and Remaining Open Problems. School of Information, UC Berkeley) and by linking graphs to OLAP systems (described in Cao, L. et. al. (2002). Ontology-based Integration of Business Intelligence. University of Sydney), as well as designs for editing these relationships by linking graphs to spreadsheets where the relationships can be edited in tables.

However, the prior art does not address numerous issues that can arise when using tables to browse and edit relationships with higher arity and cardinality in graphs and ontologies.

Issue 1:

If one starts from the roll-up in FIG. 4 and drills down, then one will need to drill down through multiple layers that are not informative before one begins to distinguish the different nodes that were rolled up, as shown in FIG. 5.

Issue 2:

Even if one could address Issue 1 by eliminating redundant layers such as "Asset" and "Device" in FIG. 5, it can still be confusing to see redundant information to the right of the expanded cells, such as seeing all the companies to the right of "Electronic device" if one expands "Company, even though one sees them again for the more-specific products that appear when one expands "Electronic device". FIG. 6 illustrates this additional redundancy.

Issue 3:

When one selects a table's page headers, row headers, and column headers from properties in a graph, one may want to describe a default superclass for the objects of each property in that table so that new nodes created in the table obtain a superclass typical of objects of that property. This happens automatically to data entered into a table in a relational database, but it does not happen automatically to data entered into a table representing relationships in a graph.

For example, assume one enters a new row at the end of the table shown in FIG. 2, as shown in FIG. 7.

This entry can create a new node that has all of the attributes in this new table row, including that it "is a Transaction". But the attribute "buyer Genentech" has an object that does not exist, so a "Genentech" node must also be created. And that node will not have any of its own attributes. One may want it to have the attribute "is a Company", but prior art does not offer a way to do that when one enters a new node into a table that represents higher-arity relationships in a graph.

Issue 4:

When one selects a table's page headers, row headers, and column headers, one may want to select at least one header from not only properties in a graph but also property paths. For example, one may want to sort the Transactions in the graph in FIG. 1 by what their products are made with, so one may want to select a row header from the property path "product:made with", where ":" signifies a node that is an object of a triple whose predicate is the "product" property and is a subject of another triple whose predicate is the "made with" property, as shown in FIG. 8.

This introduces additional issues for data entry in the table. Assume that one enters a new row at the bottom of the table shown in FIG. 8, as shown in FIG. 9.

In addition to Issue 3, here we have another issue due to the use of a property path. Entry of this new table row can create a new node that has all of the attributes in this new table row, including that the new node "is a Transaction", but it is ambiguous what to do with the attribute "product:made with GPU" because its predicate is a property path. This new table row suggests that the new node should have a "property" attribute whose object should in turn have the attribute "made with GPU". If the property "made with" is transitive and reflexive, then the nodes "CPU", "Notebook PC", and "PC" all meet that criteria. Which node should the new Transaction use? Or should we create a new node for the new Transaction to use?

Issue 5:

FIG. 8 also illustrates that even if one solves Issue 1 and Issue 2, one may still be burdened by redundancy when browsing objects of a transitive property like "made with". One sees Transactions with "product Notebook PC" three times and the Transactions with "product CPU" two times. One might like the ability to use OLAP roll-up not just with the "is a" property but also with another transitive property like "made with", so that one can group the objects of "product" attribute that are "made with" the same node, viewing the "buyers", "sellers", etc. for that group, and then to expand that group to see more-specific groups and to remove "buyers", "sellers", etc. from the more general group that was expanded. Prior art provides no adequate method to perform this roll-up and expansion with a transitive property other than a subsumption property like "is a".

Issue 6:

In practice, graphs are typically much larger than the example in FIG. 1, so typically one will need to filter a table for only some objects of at least one of the properties. For example, one may want to see only the Transactions in which Intel participated. When one wishes to do this, the graph in FIG. 1 will prove problematic, because one will only be able to filter the table in FIG. 2 for Intel as a "buyer", as shown in FIG. 10 or as a seller as shown in FIG. 11 but not as either. One will be unable to include both of Intel's two Transactions in a single table, so one will be unable to follow Intel's participation in the value chain of products in this graph.

BRIEF DESCRIPTION OF THE DRAWINGS

FIG. 2 shows the data in FIG. 1 depicted as a table with only a page header area and row header area.

FIG. 3 shows the data in FIG. 1 depicted as a table with not only a page header area and row header area but also column header area and a grid area.

FIG. 4 shows the data in FIG. 1 depicted as a table with "OLAP roll-up" along the "is a" property.

FIG. 5 shows the data in FIG. 1 depicted as a table with "OLAP roll-up" along the "is a" property followed by "drilling down" in the "product" attribute.

FIG. 6 shows the data in FIG. 1 depicted as a table with "OLAP roll-up" along the "is a" property followed by "drilling down" in the "product" attribute and also the "buyer" attribute.

FIG. 7 is a depiction of using a row in a table to add new data to the data in FIG. 1

FIG. 8 shows the data in FIG. 1 depicted as a table that uses not only "properties" but also a "property path".

FIG. 9 is a depiction of using a row in a table that uses a property path to add new data to the data in FIG. 1.

FIG. 10 is a subset of the data in FIG. 1 that results from filtering for only nodes with the attribute "buyer Intel", depicted as a table.

FIG. 11 shows a subset of the data in FIG. 1 that results from filtering for only nodes with the attribute "seller Intel", depicted as a table.

FIG. 20 shows the data in FIG. 1 depicted as a table with not only "OLAP roll-up" along the "is a" property but also a "least common subsumer algorithm" to reduce redundancy.

FIG. 21 shows the data in FIG. 1 depicted as a table with not only "OLAP roll-up" along the "is a" property but also a "least common subsumer algorithm" to reduce redundancy, followed by drilling down in the "product" attribute

FIG. 22 show the data in FIG. 1 depicted as a table with not only "OLAP roll-up" along the "is a" property and a "least common subsumer algorithm" to reduce redundancy but also an additional "remove roll-up on expansion algorithm" to reduce redundancy further.

FIG. 23 illustrates an example of an attribute Editor Menu, highlighting Edit global defaults for 'buyer'.

FIG. 24 illustrates an example of a setting a default superclass.

FIG. 25 illustrates an example of an attribute Editor Menu, highlighting Extend 'product'.

FIG. 26 illustrates an example of creating a property path.

FIG. 27 show the data in FIG. 1 depicted as a table with only a page header area and row header area and with a property path in the row header area.

FIG. 29 illustrates an example of a subprocess of the process depicted in FIG. 28.

FIG. 30 illustrates an example of a subprocess of the process depicted in FIG. 28.

FIG. 32 illustrates an example of a selecting a node to serve as the object of an Inferred Class.

FIG. 33 illustrates an example of a selecting a property to utilize as the predicate in an Inferred Class whose object is the node previously selected.

FIG. 34 illustrates an example of an addition to the table of the Inferred Class "made with Chip tester".

FIG. 35 illustrates an example of an drill-down by expanding the Infered Class "made with Chip test".

FIG. 36 illustrates an example of a further drill-down by expanding the Inferred "made with CPU".

DETAILED DESCRIPTION OF ONE OR MORE EMBODIMENTS

The disclosure is particularly applicable to a client server architecture computer system that implements the system and it is in this context that the disclosure will be described. It will be appreciated, however, that the system and method has greater utility since it may be implemented using other computer systems and computer architectures that are within the scope of the disclosure. The system and method also have use in a large number of applications that involve manipulating higher arity and cardinality in a graph or ontology, and its delivery stack can be modified for different computing environments, as well as for different formats and storage mechanisms for graphs and ontologies.

Figure 1:
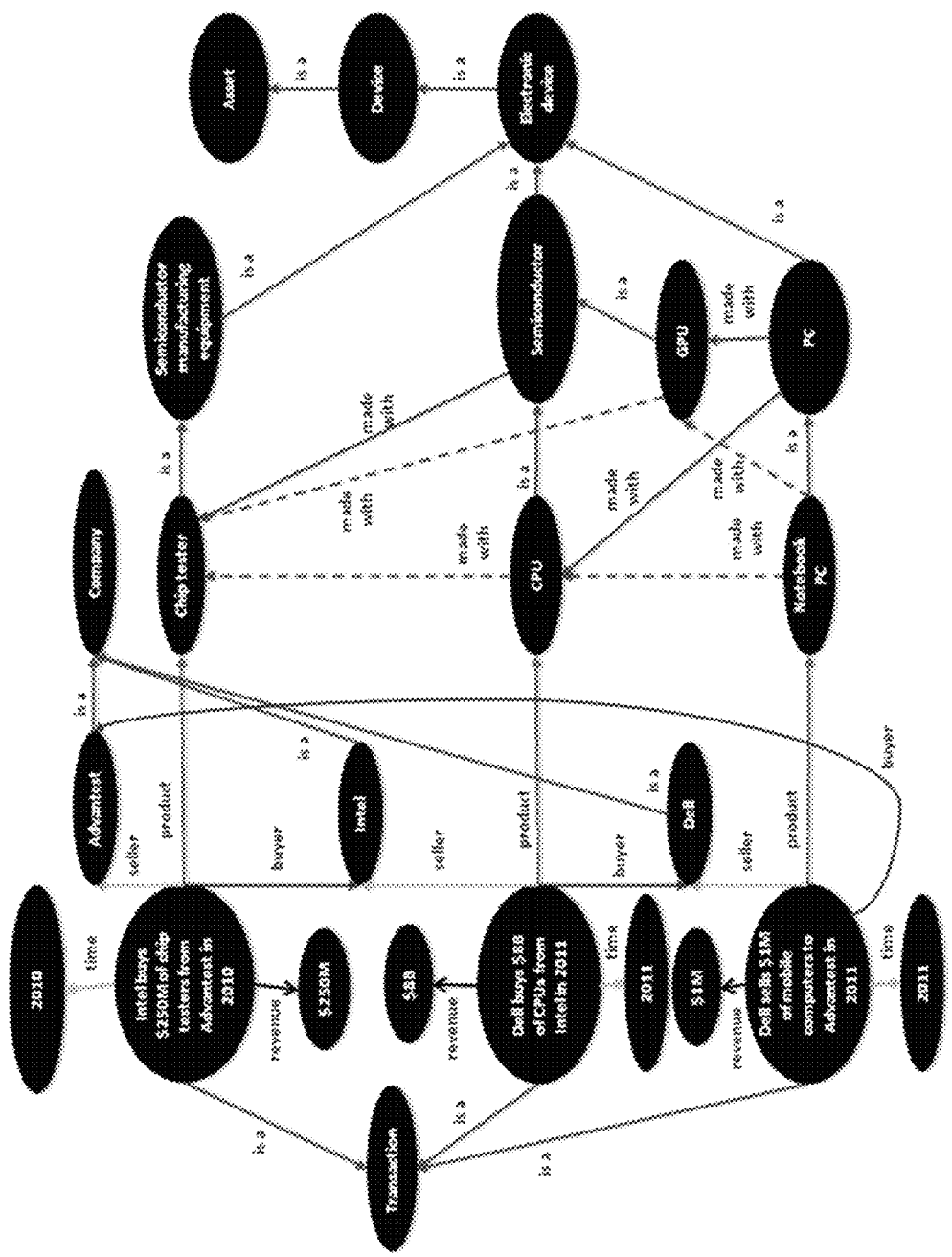
FIG. 1 shows data structured as a "graph", depicted as a "visualization" that includes "nodes" depicted in black and "edges" depicted in color.

The disclosure is particularly applicable to a "tabular graph editor" that enables a user to employ tables to browse and edit comparisons by multiple attributes of nodes in a graph, such as by the "product", "buyer", "seller", "time", and "revenue" attributes of the "Transactions" in the graph in FIG. 1. An embodiment of a technology stack 1200 (including hardware and software) that may embody the system and method is depicted in FIG. 12.

Figure 12:
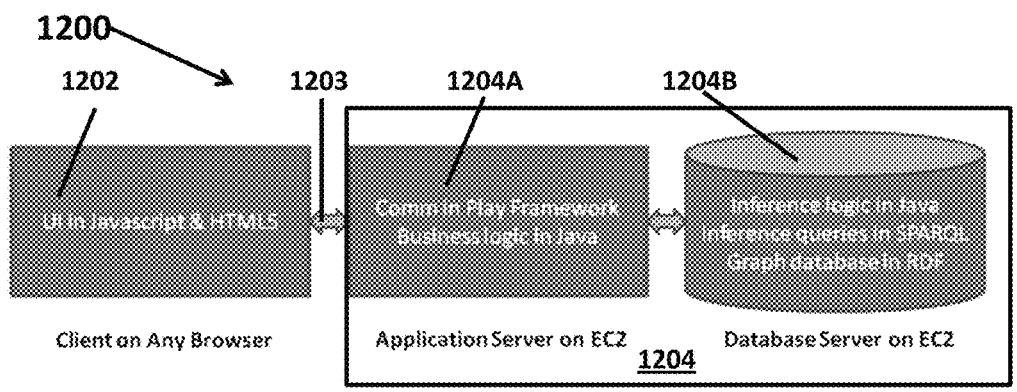
FIG. 12 illustrates one embodiment of the system that implements a tabular graph editor.

The system 1200 in FIG. 12 may include one or more computing devices 1202 that may coupled to and connect over a communications path 1203 to a backend system 1204. Each computing device may be a processor based device with persistent storage, memory, a display and wireless or wired connectivity circuits that allow each computing device 1202 to couple to and connect to the backend system 1204 over the path 1203 and exchange information/data with the backend system 1204 as described below in more detail. For example, each computing device may be a personal computer, a terminal, a laptop computer, a tablet computer, a smartphone device and the like. In one implementation, as shown in FIG. 12, each computing device 1202 may store and execute a browser application that exchanges data with the backend system 1204 and displays a user interface based on data from the backend system. In one implementation, the data from the backend system 1204 may be Javascript and/or HTML5 data/code that is rendered by the browser application. In other implementations, each computing device may store and execute (or download, store and execute) an application or a mobile application to interact with the backend system 1204. Thus, as shown in FIG. 12, the system may operate with any client/computing device using any application, including a browser application.

In the web application implementation of FIG. 12, the web application may be developed using Java and some hypertext markup and scripting languages and libraries, such as HTML5, Javascript, and the Sencha Ext JS framework for Javascript.

The communication path 1203 may be a wired or wireless communcations path that uses a protocol or a secure protocol, such as HTTP or SHTTP for example, to allow the computing devices to connect to and communicate with the backend system 1204. The communications path may be a wired computer network, a wireless computer network, a wireless cellular digital data network or a combination of one or more of these networks.

Figure 13:
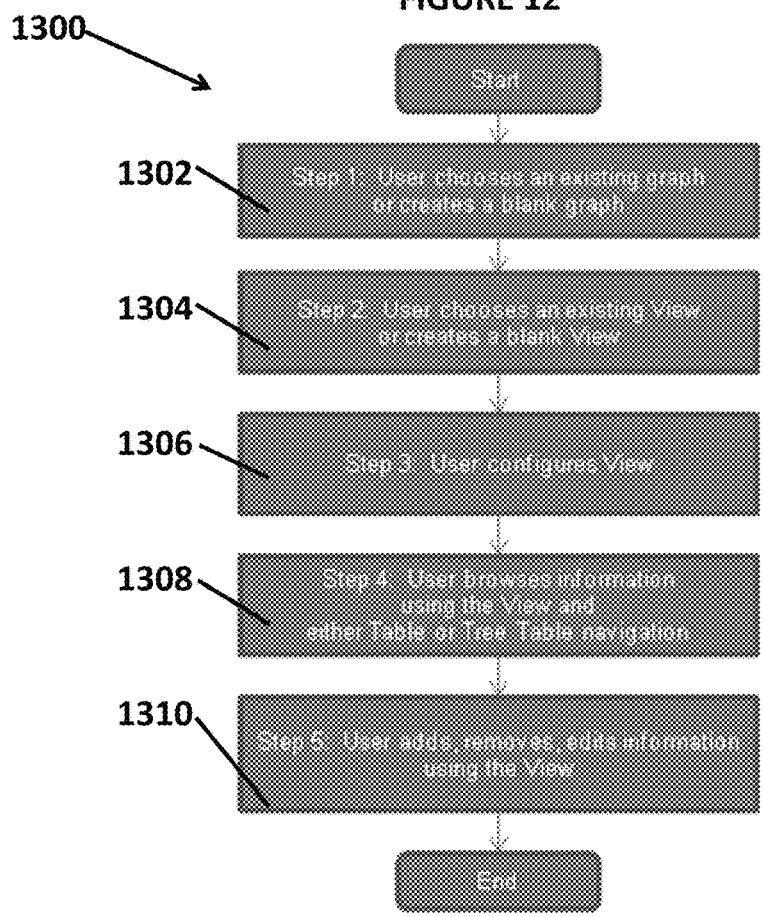
FIG. 13 illustrates a workflow implemented by the system in FIG. 12.

The backend system 1204 may be implemented using one or more computing resources, such as one or more server computers as shown in the implementation shown in FIG. 12 or using one or more cloud computing resources, wherein the one or more computing resources may include one or more processors, one or more memories and the like. In a software implementation of the system, the components of the backend system 1204 may be implemented as a plurality of lines of computer code that may be stored and executed on the one or more computing resources to perform the various operations of the system and method such as those shown in FIG. 13. In a hardware implementation of the backend system, each component of the backend system 1204 may be implemented in a hardware device, such as an ASIC, programmable logic device, gate array and the like, that is designed or programmed to perform the various operations of the system and method such as those shown in FIG. 13. The backend system 1204 may also be implemented as a plurality of lines of computer code stored on a computer readable medium, such as a disk, CD, DVD, etc. or downloadable from a site onto a computer and then operated on the computer to perform the various operations of the system and method such as those shown in FIG. 13.

The components of the backend system 1204 may further comprise a graph editor component 1204A and a storage component 1204B that are coupled to each other. In the embodiment shown in FIG. 12, the graph editor component 1204A may be implemented on an application server on Amazon, Inc.'s Elastic Compute Cloud ("EC2") and may include a communications element implemented using the Play Framework and a logic element implemented in Java. In the embodiment shown in FIG. 12, the storage component 1204B may be implemented on a database server on EC2 and may include inference logic implemented in Java, inference queries implemented using SPARQL and a graph database implemented using RDF.

While the embodiment shown in FIG. 12 utilizes the W3C standard RDF structure for graphs, it will be appreciated that the system and method has utility in any graph structure, including but not limited to directed graphs, undirected graphs, simple graphs, multigraphs, hypergraphs, property graphs, Bayesian networks, Markov networks, Markov logic networks, and others.

While the embodiment shown in FIG. 12 utilizes the W3C standard graph query language SPARQL, it will be appreciated that the system and method has utility with any graph query language, including but not limited to Cypher and GraphQL. While the embodiment shown in FIG. 12 utilizes the ontology languge OWL2EL, it will be appreciated that the system and method has utility with any ontology language, including but not limited to other profiles of OWL2, other Description logic-based ontology languages such as OWL, KL-ONE, and RACER, Frame-based ontology languages such as F-Logic, OKBC, and KM, and First-order logic-based ontology languages such as Common Logic, CycL, and KIF.

The following describes how to utilize the system and method. The tabular graph editor component 1204A implements a 5-process workflow illustrated in FIG. 13. In the system operation, the user of the system may often follow the sequence in the flowchart of FIG. 13, but may also perform the processes in a different sequence and may often repeat processes iteratively while browsing and editing.

Figure 14:
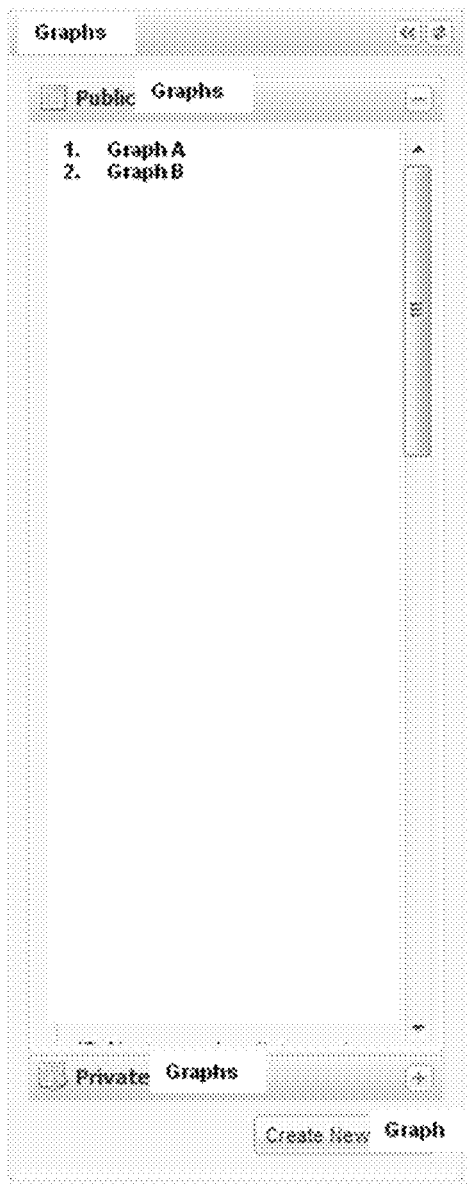
FIG. 14 illustrates an example of a graph selection panel.

Step 1:

The user can log into the system by opening any web browser, typing the web application's URL in the browser's address bar, and typing in his user name and password. Then the user can open a "Graphs" panel in the browser, as shown in FIG. 14, where he can choose an existing graph from a list of Public Graphs available to more than one user and a list of Private Graphs available only to this user, or he can create a blank graph (1302).

When the user selects a graph from the list, the application will load that graph into the graph database and perform subsequent steps on that graph to browse it and edit it. For purposes of illustrating the subsequent processes in FIG. 13, the graph illustrated in FIG. 1 will be used.

Figure 15:
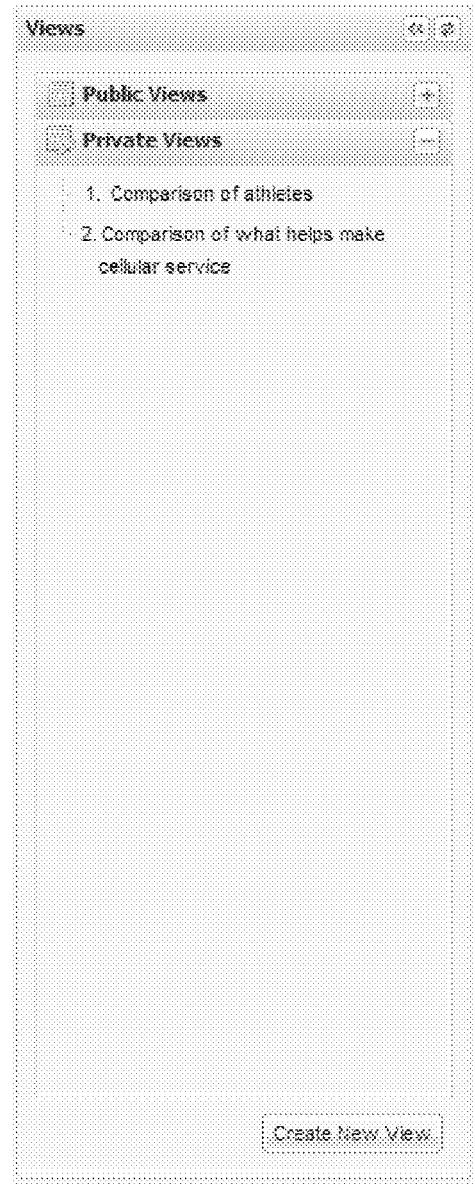
FIG. 15 illustrates an example of a View Selection Panel.

Step 2:

The user can choose a "View", which is a configuration of table page headers, row headers, column headers, and grid area headers with which to view the graph that he chose. Users may configure numerous Views and switch between them to switch quickly between different perspectives of the graph. To do this, the user may open a Views panel in the browser, as shown in FIG. 15, where he can choose an existing View from a list of Public Views available to more than one user and a list of Private Views available only to this user, or he can create a blank View (1304). For purposes of the example, let's assume that the user chooses to create a new View that he calls "Comparison of electronic device transactions".

Figure 16:
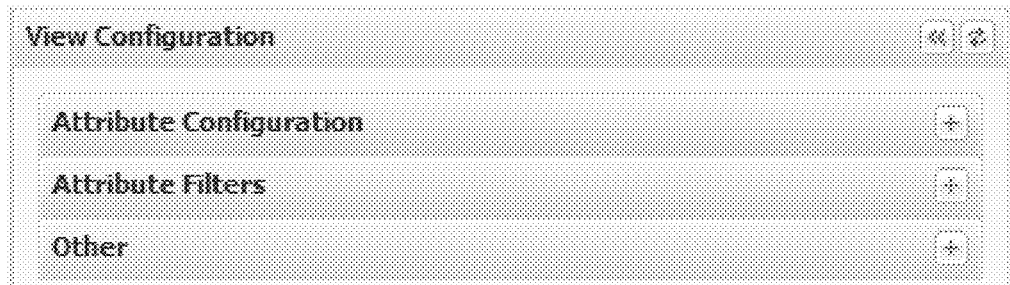
FIG. 16 illustrates an example of a View Configuration Panel.

Step 3:

The user may configure the View (1306) by creating or changing an orientation of properties and/or property paths as page headers, row headers, column headers, and/or grid area headers, creating or changing filters for those properties, and changing other settings. To do this, he opens a View Configuration panel, where he has three choices, an example of which is shown in FIG. 16.

Figure 17:
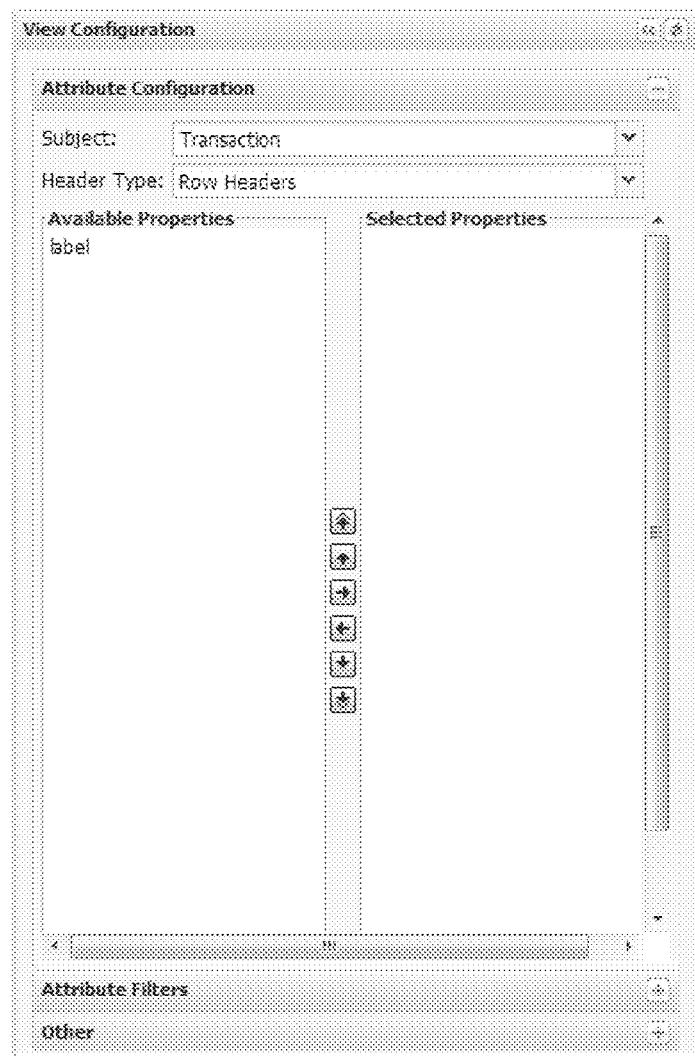
FIG. 17 illustrates an example of an Attribute Configuration Wizard.

In one example, let's assume that the user chooses Attribute Configuration. The user may be provided a wizard for assigning properties to page headers, row headers, column headers, and grid area headers, an example of which is shown in FIG. 17. The user must choose a "Subject", which limits the View to show attributes whose subject has an "is a" relationship to this Subject. In an example, the user chooses "Transaction" in order to assign FIG. 1's "Transactions" as subjects for this View so that we can browse and edit their attributes.

Figure 18:
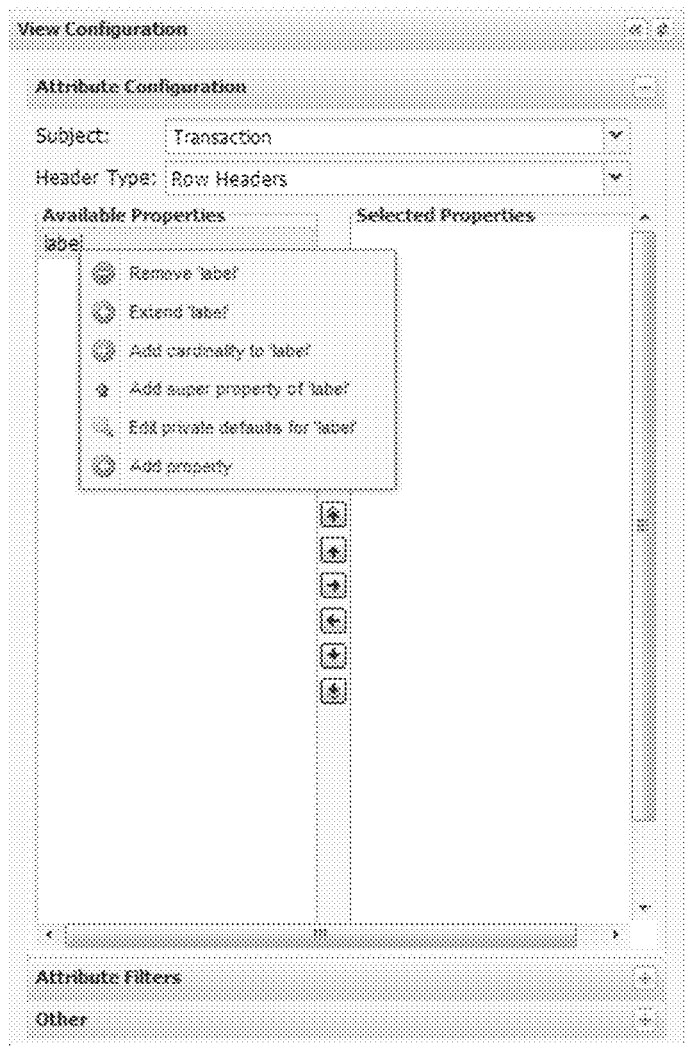
FIG. 18 illustrates an example of an Attribute Editor Menu, highlighting Add Property.
Figure 19:
FIG. 19 illustrates an example of an adding a property to a view configuration.

When the user opens an Attribute Configuration for this new View, the user sees "label", which connects each node to its name, as the only choice in Available Properties. To add another choice to Available Properties, the user can right-click and select "Add property", as shown in FIG. 18. When the user selects "Add property" from this menu, the user may be presented with an Add Property dialog that enables him to select properties in the graph, as shown in FIG. 19.

When the user does this multiple times, he can fill Available Properties with all the properties in FIG. 1. The user may then select from them for page headers, row headers, column headers, and grid area headers.

Step 4:

To browse and edit any View, the user may choose Table navigation or Tree Table navigation (1308).

If the user wants an OLAP aggregation like in FIG. 4, he may choose Tree Table navigation. The user may also refresh the View to display the subject's attributes in his chosen View configuration, such as is shown in FIG. 20.

Notice the difference between FIG. 20 and FIG. 4. To address Issue 1 of typical systems described above, the system and method may apply a Least Common Subsumer algorithm (described in Cohen, W. et. al. (1992). Computing Least Common Subsumers in Description Logics. PROCEEDINGS OF THE 10TH NATIONAL CONFERENCE ON ARTIFICIAL INTELLIGENCE and Baader et al. (1999) Computing least common subsumers in description logics with existential restrictions. In Proceedings of the 16th Int. Joint Conf. on Artificial Intelligence (IJCAI-99), pages 96-101) to eliminate uninformative steps in the drill-down. This causes the table in FIG. 20 to start with "product Electronic device" instead of starting with the more-general "product Asset" seen in FIG. 4. As a result, when the user drills down, he is not burdened by the redundancy seen in FIG. 5 but instead sees a distinction immediately, as shown in FIG. 21.

Figure 21B:
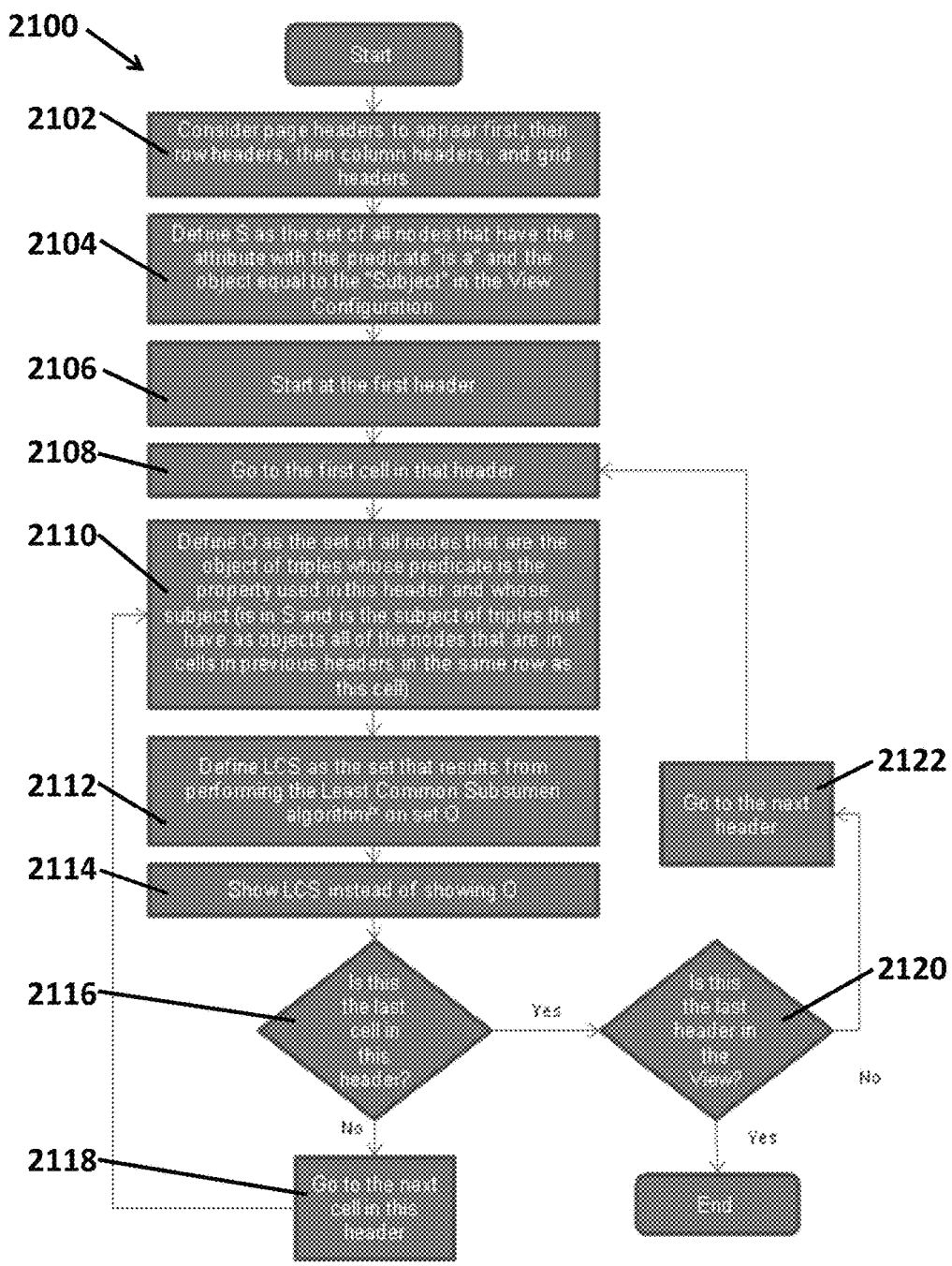
FIG. 21B illustrates a process for reducing redundancy in tables with OLAP roll-up by including only least consumer subsumers.

FIG. 21b illustrates an example of a method for Tree Table construction using the Least Common Subsumer algorithm. This process orders table headers by page headers first, then row headers, then column headers, and then grid headers (2102). It defines S as the set of all nodes that have an attribute with the predicate "is a" and the object equal to the "Subject" in the View Configuration (2104). Then it starts at the first header (2106), goes to the first cell in that header (2108), defines O as the set of all nodes that are the object of triples whose predicate is the property used in this header and whose subject is in S and is the subject of triples that have as objects all of the nodes that are in cells in previous headers in the same row as this cell (2110), defines LCS as the set that results from performing the Least Common Subsumer algorithm (described in Cohen, W. et. al. (1992). Computing Least Common Subsumers in Description Logics. PROCEEDINGS OF THE 10TH NATIONAL CONFERENCE ON ARTIFICIAL INTELLIGENCE and Baader et al. (1999) Computing least common subsumers in description logics with existential restrictions. In Proceedings of the 16th Int. Joint Conf. on Artificial Intelligence (IJCAI-99), pages 96-101) on set O (2112), and shows LCS instead of O (2114). Then it checks whether this is the last cell in this header (2116). If it is not, then it increments to the next cell in this header (2118) and returns to 2110. If it is, then it checks whether this is the last header in the View (2120). If it is not, then it increments to the next header in the View (2122) and returns to 2108. If it is, then the process ends.

Returning to FIG. 21, when the user expands in "Electronic device", there is still redundant information in the "buyer" and "seller" attributes, as described in Issue 2 for the typical systems. The user can choose to remove that redundancy by choosing a View Configuration setting called "Remove Roll-up upon Expansion." Then instead of FIG. 21, the user would see the user interface in FIG. 22 in response to the view configuration setting change. This enables the user to see whether there are any Transactions that describe a buyer and seller (a) specifically for the product "Electronic device", instead of (b) more generally for ("Electronic device" or "is a Electronic device"). When the user chooses the setting "Remove Roll-up upon Expansion" in the View Configuration, then upon expansion of any cell in the View, the system automatically recreates the cells to the right of the expanded cell using criteria (a) above instead of criteria (b) above. In this example, this clarifies that there are no Transactions in this graph whose product is specifically "Electronic device". In larger tables than this example, this can clarify comparisons dramatically.

Step 5:

While browsing comparisons like this one, the user may want to edit the comparisons (1310), such as by entering a new transaction like the one in FIG. 7. To address Issue 3 of the typical systems, in which a "Genentech" node is created without an attribute "is a Company", the system and method provide the user the ability to set for a Default Superclass for each property or property path. In this example, the user may set for the "buyer" attribute a Default Superclass "is a Company". The user can set the Default Superclass for any property in the Attribute Configuration panel. To do this, the user right-clicks the property and selects "Edit global defaults . . . ", as shown in FIG. 23. The user may then select a node as the Default Superclass, as shown in FIG. 24. Then whenever the user enters into the "buyer" property an object that does not yet exist, the graph editor may create that object and also may create for it an "is a Company" attribute.

The graph editor may also provide the user the ability to set "Private Defaults" that override the Global Defaults but only for his entries, so that one user may change the Default Superclass that he uses for a property without changing the Default Superclass that others use for that property. To set these Private Defaults, the user can select "Edit private defaults . . . " from the menu depicted in FIG. 23.

If the user wants to browse and edit the graph in a table like the one in FIG. 8, the user can switch from Tree Table navigation to Table navigation, which performs no OLAP roll-up. The user may also change the View configuration to replace the property "product" with the property path "product:made with" using the graph editor. Specifically, the user, in the Attribute Configuration panel, may right-click the property "product" and select the menu item "Extend 'produce'", as shown in FIG. 25. The user may then add the property "made with" to create a property path, as shown in FIG. 26. Thus, the user may browse and edit a table like FIG. 8, as seen again in FIG. 27.

Now suppose the user enters a new row like the one in FIG. 9. To address Issue 4 of the typical systems, which is the ambiguity about what should be the "intermediate node" that is the object of the property "product", the system and method provide an "Add Attribute" command to help the user disambiguate the entry. The command can trigger the method illustrated in FIG. 28. The method illustrated in FIG. 28 starts by transforming a table-based user input into triples T (2802).

That transformation is illustrated in FIG. 29. It starts with user input into a table row a subject and one or more attributes for that subject. For example, in 2902, the user input R1 for the subject and eight (8) attributes for that subject: Prop 1 as predicate path and blank as object, Prop 2 as predicate path and R2 as object, Prop 2: Prop 4 as predicate path and blank as object, Prop 2: Prop 3: Prop 5: Prop 8 as predicate path and R3 as object, Prop 2: Prop 3: Prop 6 as predicate path and L1 as object, Prop 2: Prop 3: Prop 7 as predicate path and blank as object, Prop 2: Prop 4: Prop 8 as predicate path and R2 as object, and Prop 2: Prop 4: Prop 8: Prop 9 as predicate path and L2 as object. It transforms that table-based user input into triples (2904), with "unspecified" nodes where columns were missing in the table entry (2906), and "*" nodes where blanks were present in the table entry (2908).

Figure 28:
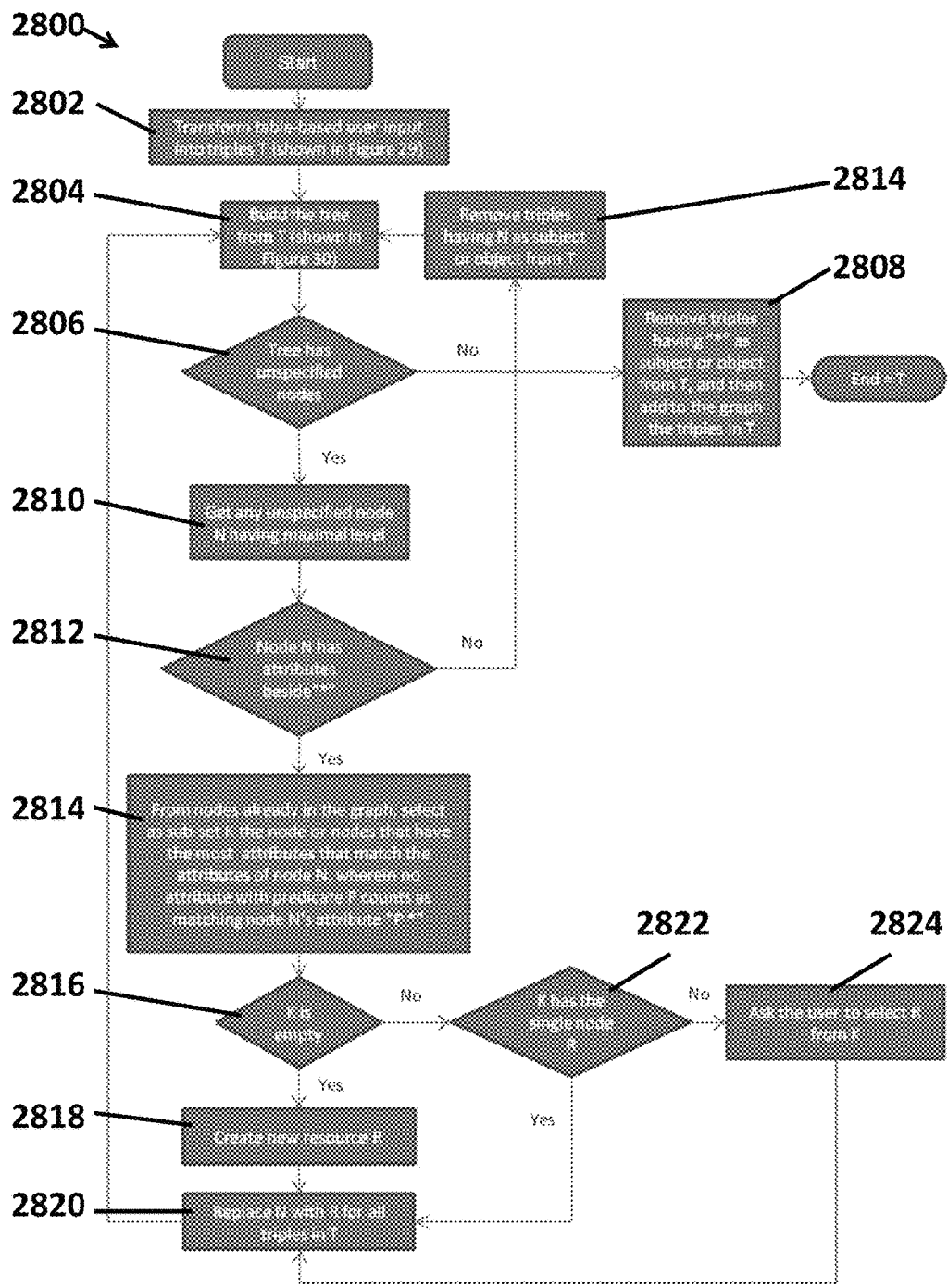
FIG. 28 illustrates an example of a process for eliminating ambiguity when using a table to add attributes to data structured as a graph.

After the transformation illustrated in FIG. 29, the method illustrated in FIG. 28 continues by building a tree from T (2804).

That tree-building is illustrated in FIG. 30. It starts by considering the base node as the root of the tree, and if the base node is not specified in the table entry, it is considered as a missing column with a property path of length 0. For the example data from the table entry illustrated in FIG. 29, it starts with node R1 (3002) as the root and builds the tree using the triples from 2904. In a resulting tree T, we define "the level of node N in the tree T" as the minimal possible height the sub-tree S of T if S contains N. We define "the attributes of the node N" as the set of pairs (outgoing arc of N, node). Node N "has attribute M" if there is attribute pair (<any outgoing arc of N>, M) in the attributes of N. For example, node R2 has attributes {(Prop 9, L2), (Prop 4, *), (Prop 3, U1)}.

After the tree-building illustrated in FIG. 30, the method illustrated in FIG. 28 continues by asking whether the tree T has unspecified nodes (2906). If answer is no, then it removes from T any triples having "*" as subject or object and adds to the graph the triples in T (2908), and then the process ends. If the answer is yes, then it gets any unspecified node N having the maximal level (2810) and asks whether node N has attributes beside "*" (2812). If the answer is no, then it removes from T any triples having N as subject or object (2814), and it goes to 2804. If the answer is yes, then from nodes already in the graph, it selects as sub-set K the node or nodes that have the most attributes that match the attributes of node N, wherein having no attribute with predicate P counts as matching node N's attribute with predicate P and object*(2814). Then it asks whether sub-set K is empty (2816). If the answer is yes, then it creates a new node R in the graph (2818), replaces N with R for all triples in T (2820), and goes to 2804. If the answer is no, then it asks whether the sub-set K includes only one node (2822). If the answer is yes, then it goes to 2820. If the answer is no, then it asks the user to select a node R from the sub-set K (2824) and then goes to 2820.

Figure 31:
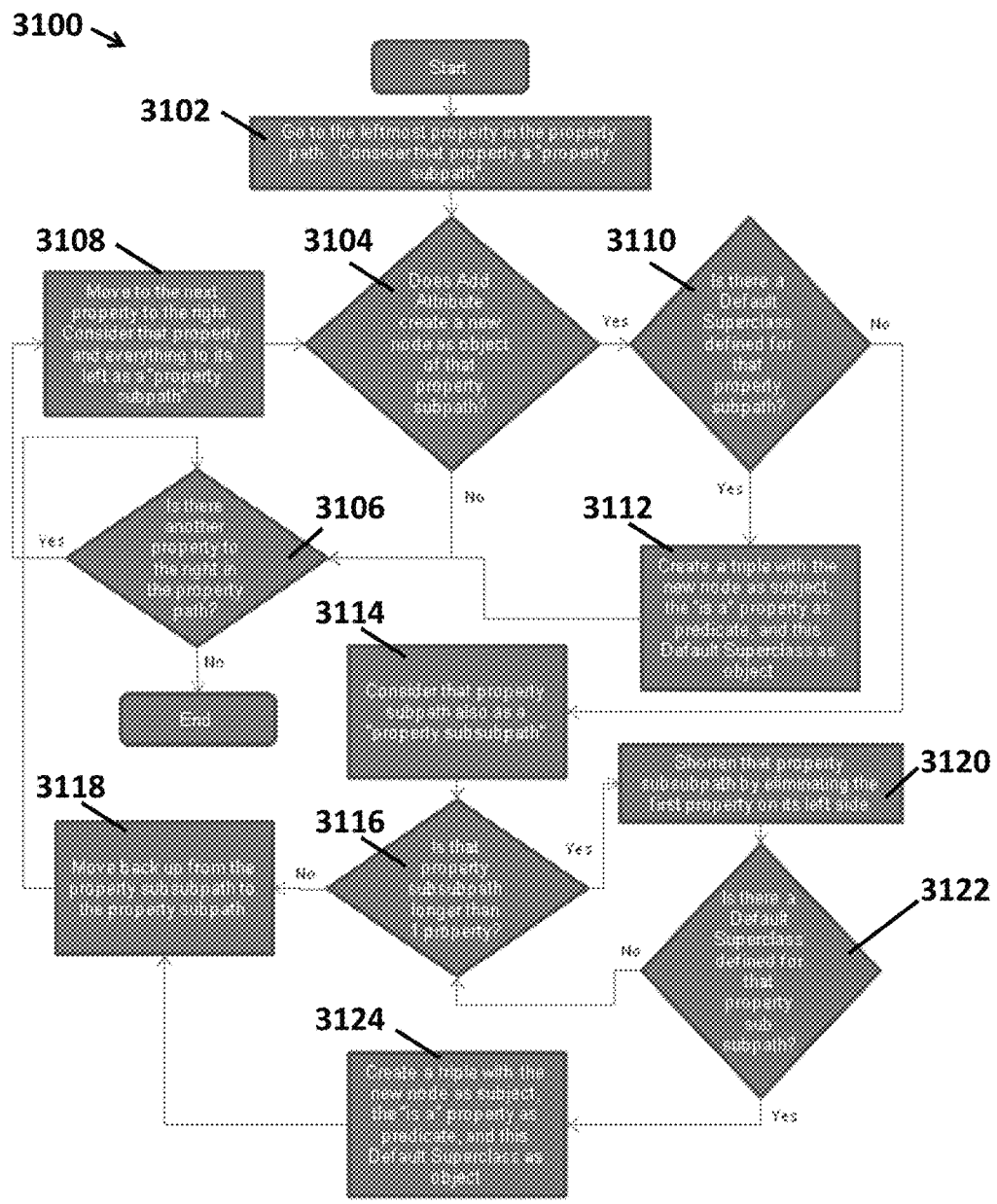
FIG. 31 illustrates an example of a process for applying a Default Superclass to the object of each property in a property path, providing that Default Superclasses defined for more-specific, longer property paths will be chosen over Default Superclasses defined for any more-general, shorter property paths within those more-specific, longer property paths.

After "Add Attribute" creates triples as described above, the system may also apply Default Superclasses to any new nodes that it has created. When setting Default Superclasses in the Attribute Configuration panel, as shown previously in FIG. 23 and FIG. 24, the user can set a Default Superclass not only for any property but also for any property path. That could produce ambiguity about what Default Superclass to apply to the object of each property in a property path, so the invention provides that Default Superclasses defined for more-specific, longer property paths will be chosen over Default Superclasses defined for any more-general, shorter property paths within those more-specific, longer property paths. This prioritization can be implemented via a process like the one depicted in FIG. 31. This process starts by going to the leftmost property in the property path, which property is considered a "property subpath" (3102). Then it asks whether Add Attribute creates a new node as object of that property subpath (3104). If not, then it asks whether there is another property to the right in the property path (3106). If not, then the process ends. If so, then it moves to the next property to the right, considers that property and everything to its left as a "property" subclass, and moves to 3104. If the answer to 3104 is "Yes", then it asks whether there is a Default Superclass defined for that property subpath (3110). If so, then it creates a triple with the new node as subject, the "is a" property as predicate, and this Default Superclass as object (3112), and then moves to 3106. If not, it considers that property subpath also as a "property subsubpath" (3114) and asks whether that property subsubpath is longer than 1 property (3116). If not, then it moves back up from the property subsubpath to the property subpath (3118) and moves to 3106. If so, then it shortens that property subsubpath by eliminating the first property on its left side (3120) and asks whether there is a Default Superclass defined for that property subsubpath (3122). If not, it moves to 3116. If so, it creates a triple with the new node as subject, the "is a" property as predicate, and this Default Superclass as object (3124) and moves to 3118.

By providing the preceding solutions to eliminate ambiguity, the system and method address Issue 4 of the typical systems and makes property paths practical to use as table headers for browsing and editing a graph.

But as illustrated in Issue 5 described above, property paths can still result in redundancy when they end in properties that are transitive. To offer an improved representation for those cases, the system and method provide for creation of "Inferred Classes". To do this, the user may start in a table like FIG. 20, right-click a cell in the table, and choose "Create Incoming Expression" as shown in FIG. 32.

The user may choose a property that he wishes to browse transitively, as shown in FIG. 33 and the system may create an Inferred Class described by an attribute in that property that is the Least Common Subsumer of the attributes in that property of all the nodes that had been subsumed by (rolled-up into) the node in the cell that was right-clicked. In this example, "made with Chip tester" is the Least Common Subsumer of the "made with" attributes of all the nodes that can appear as objects of the "product" property in this Table. The result for this example is shown in FIG. 34.

If the user expands the Inferred Class "made with Chip tester", the user can distinguish the Transactions with "product Chip tester" from the Transactions whose product is made with a Chip tester but is not a chip tester. The most-specific "made with" attribute that these other products have in common is "made with CPU", as shown in FIG. 35.

If the user expands the Inferred Class "made with CPU", the user can further distinguish the Transactions with "product CPU" from the Transactions whose product is made with a CPU but is not a CPU. That includes only "Notebook PC", so no further Inferred Classes are created and no further expansions are available, as shown in FIG. 36.

When the user creates an Inferred Class by performing steps like those shown in FIG. 32 and FIG. 33, then the system executes a method like the one depicted in FIG. 21b by performing the Least Common Subsumer algorithm on objects of the property used for the Inferred Classes.

Figure 37:
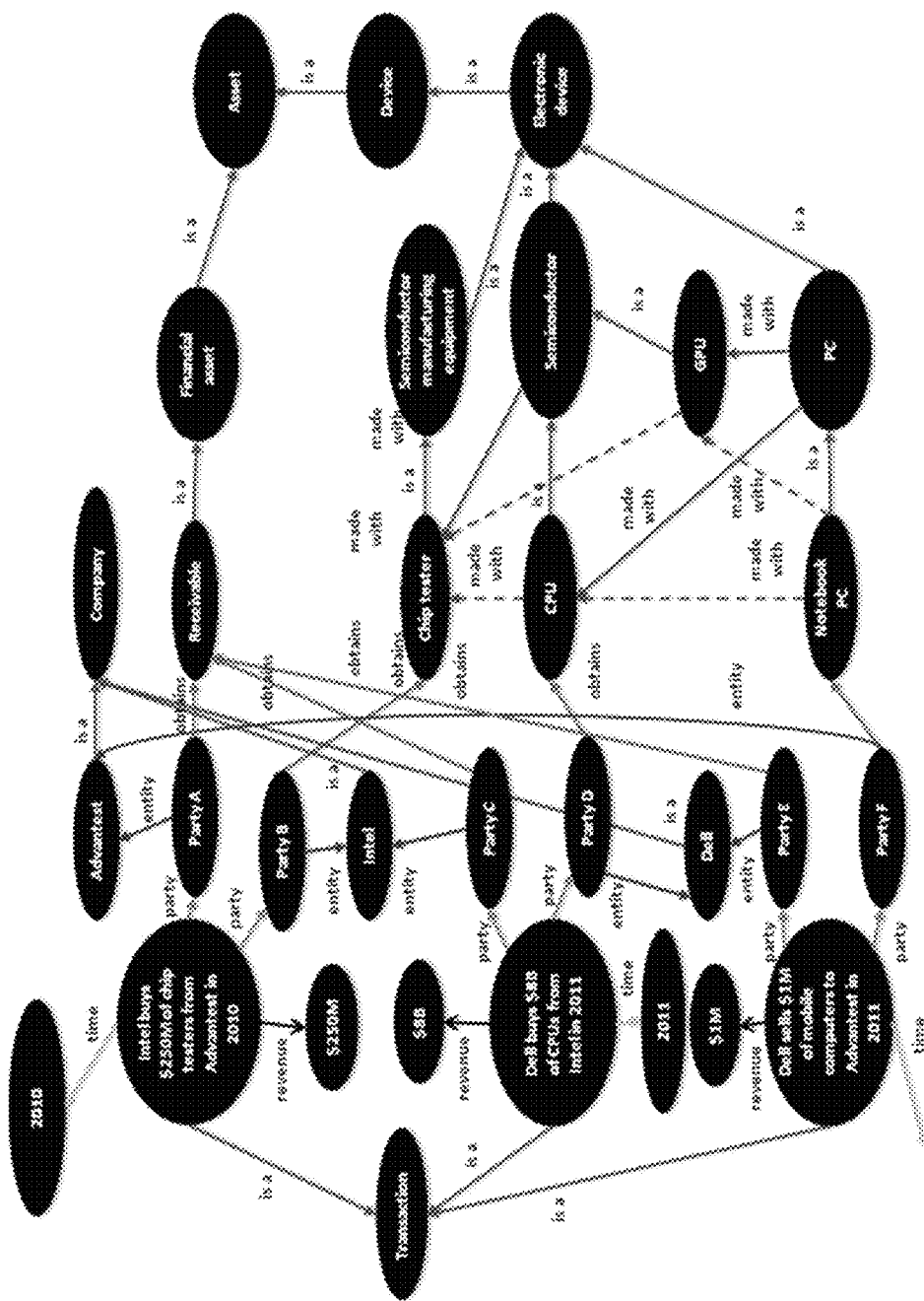
FIG. 37 illustrates an example of the data with the same meaning as the data in FIG. 1 but represented instead with higher cardinality, using the "party" property twice for each Transaction.

The system and method also addresses Issue 6 of typical systems so that the user can follow Intel's participation in the value chain of products in this graph by including all of Intel's Transactions in a single table. In particular, using the system, the user can restructure the graph from FIG. 1 by increasing the cardinality of the Transactions as shown in FIG. 37. This restructured graph represents each Transaction as having 2 "parties", with the buyer party obtaining the product and the sell party obtaining a "receivable", which is the typical accounting definition of booking revenue. Notice that each of the Transactions now has higher cardinality of 2 in the "party" property.

This higher-cardinality structure makes a visualization of nodes and edges even less comprehensible. But by enabling one to add the same property or property path to multiple table headers, our invention enables the user to filter for only Transactions that have the attribute "party:entity Intel" and then see all the Transactions in which Intel is a party, either as buyer or seller, as shown in FIG. 38.

To support this, the system and method enable the user to add cardinality to the properties and property paths that the user assigns as page headers, row headers, column headers, or grid area headers in the Attribute Configuration panel. To configure a View like the one shown in Table navigation in FIG. 38, the user can start by creating property paths as illustrated in FIG. 25 and FIG. 26. The user may add cardinality to one of the properties in each property path by choosing "Add cardinality" in the Attribute Configuration panel, as shown in FIG. 39.

Figures 38, 39:
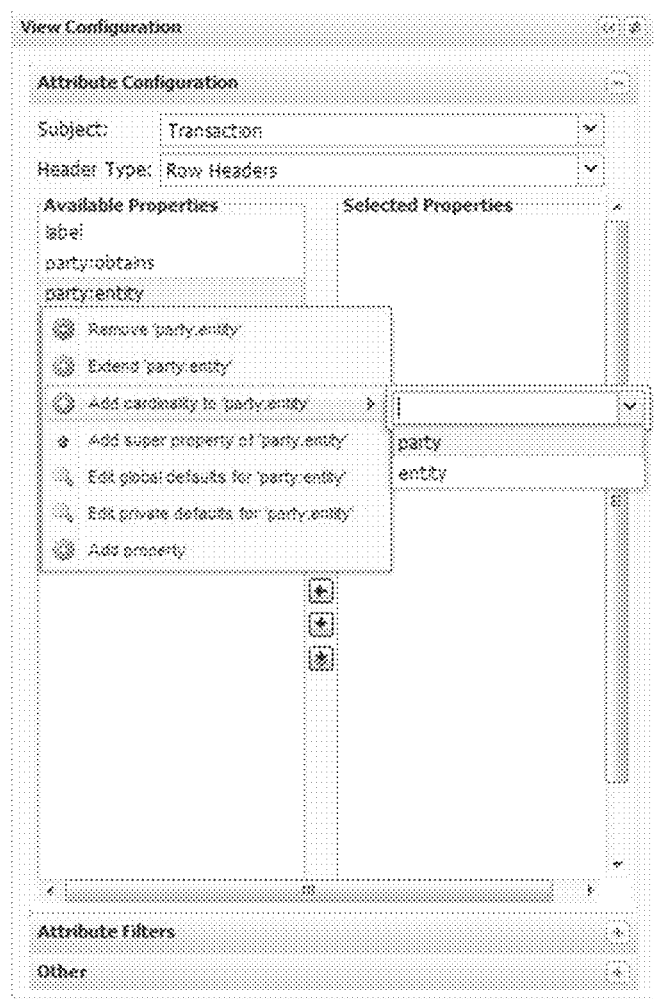
FIG. 38 illustrates an example of a subset of the data in FIG. 37 depicted as a Table and filtering for all the Transactions in which Intel is a party, either as buyer or seller, by using property paths that include higher cardinality and that use subscripts to distinguish between different instances of the same property.
FIG. 39 illustrates an example of an adding cardinality to the "party" property in the property path "party:entity".

Note that the user can choose to add cardinality to any of the properties in a property path, such as either "party" or "entity" in FIG. 39. When the user chooses a property, then the invention creates another instance of the property path, and in each instance of the property path, it subscripts the chosen property to distinguish the multiple instances of the property path as shown in FIG. 40.

By creating multiple instances of the property path, the system and method enables one property path to be treating as multiple different headers in a table, which in turn enables a table to property distinguish attributes at the end of property paths that include at least one higher-cardinality property, ensuring that there is no ambiguity in what nodes are the subjects of triples that have these property paths as predicate and table cell fillers as objects.

Figure 40:
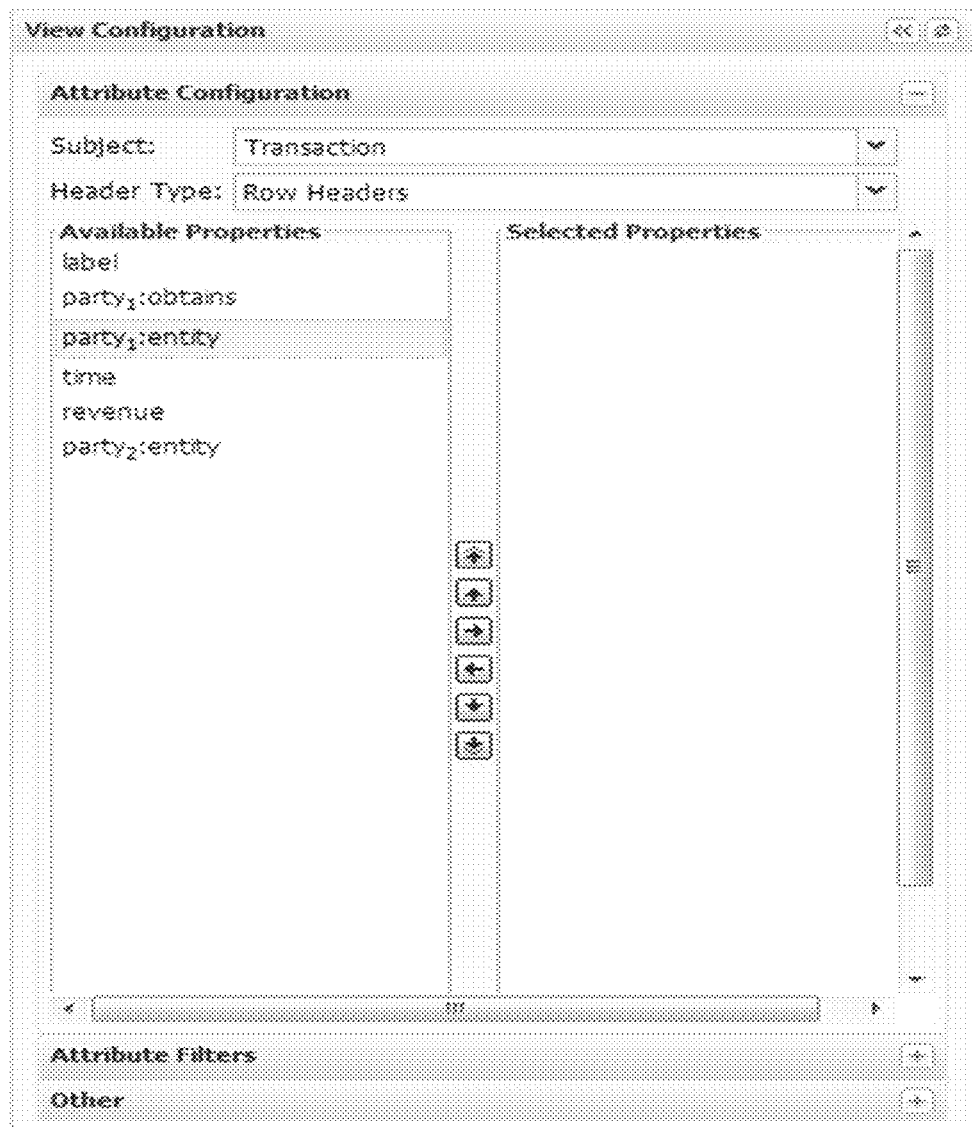
FIG. 40 illustrates an example of property paths that result after adding cardinality to the "party" property in the property path "party:entity".

As shown in FIG. 40, notice that the system and method not only adds multiple instances of the property path but also adds a subscript to every instance of the property to which cardinality was added, even in other property paths like "party:obtains". This is necessary to further ensure that there is no ambiguity in what nodes are the subjects of triples that have these property paths as predicate and table cell fillers as objects.

Figure 41:
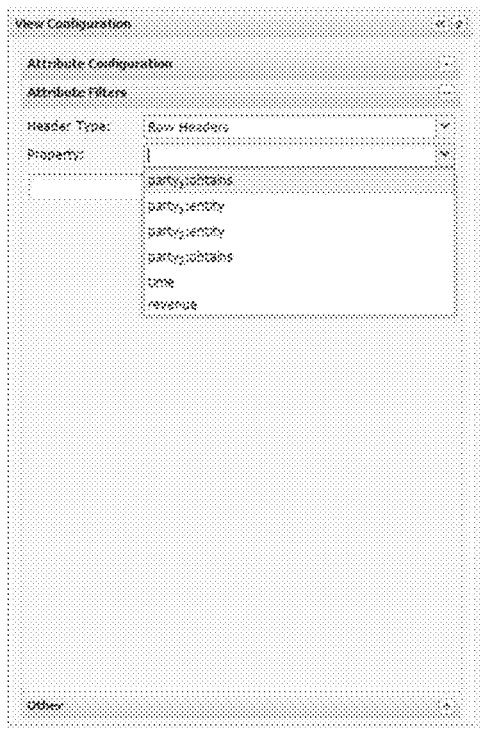
FIG. 41 illustrates an example of choosing the property path "party1:entity" with which to filter subjects of a table.

In order to get multiple instances of the "party:obtains" property path to make the table shown in FIG. 38, then the user will also add cardinality to that property path. Then the user can choose the row headers depicted in FIG. 38. To filter the view for only Transactions that have the attribute "party:entity Intel", the user can go back to View Configuration, then to Attribute Filters, and then choose one instance of this property path, as shown in FIG. 41.

Figure 42:
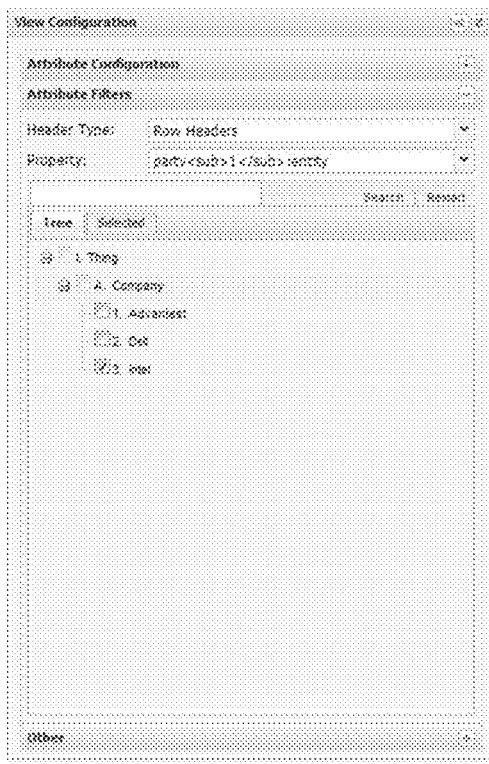
FIG. 42 illustrates an example of choosing to filter subjects of a table by the attribute path "party1:entity Intel".

The user may also select Intel from the "Filter Tree" that shows the objects of triples whose predicate is the selected property path and whose subject is the object of a triple whose predicate is "is a" and whose subject is the "Subject" in the Attribute Configuration for this View. In the "Filter Tree" shown in FIG. 42, the user filters for only Intel.

The Filter Tree denotes information through a novel iconography for its checkboxes. A checked unshaded box indicates that the user has selected this node and all the nodes subsumed by it. A checked shaded box indicates that the user has selected this node but not all of the nodes subsumed by it. A blank shaded box indicates that the user has not selected this node but has selected at least one of the nodes subsumed by it. And a blank unshaded box indicates that the user has selected neither this node nor all of the nodes subsumed by it. The invention could use other icons to show these distinctions.

The Filter Tree provides flexibility for checking and unchecking nodes by offering a novel clicking sequence. Clicking a node's checked unshaded box transforms it into a blank shaded box. Clicking a node's blank shaded box transforms it and all of its subsumed nodes' boxes into a blank unshaded box. Clicking a node's blank unshaded box transforms it into a checked shaded box. And clicking a node's checked shaded box transforms it and all of its subsumed nodes' boxes into a checked unshaded box.

After the user checks the box to filter for "party1:entity Intel", then he can see the table shown in FIG. 38. Notice that this table is filtered for Intel as the party to a Transaction, either as buyer or as seller.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A system, comprising:
   a computer system having a processor, memory and a graph database, the graph database having at least one graph having a plurality of nodes and an interrelationship between each node is represented as a triple that includes a subject, a predicate, and an object, wherein the predicate in each triple represents a property type that connects one node represented as the subject of the triple to another node represented as the object of the triple and the combination of predicate and object represents an attribute of the subject;

a graph editor component coupled to the storage component that selects a graph, selects a view of the graph that is less than the entire graph and configures the selected view of the graph;

the graph editor component configured to browse information in the view of the graph using a tabular navigation element, configured to remove redundancy from the view of the graph in the tabular navigation element and configured to change information in the graph using the view; and wherein the tabular navigation element comprises a table that shows triples stored in the graph by filtering for subjects that are subclasses of a specified class, and for each of those subjects, showing its objects using one or more of a property and a property path that are each represented by a row header, with the objects filtered in the table cells within each row, from left to right, so that each individual row shows objects with the same subject or superclass of objects with the same subject and the graph editor component that uses an add attribute command to disambiguate entries in table cells by searching for one or more nodes in the graph with a greatest number of attributes that match the added attributes represented by each cell entry as an object and its row header as the corresponding one of a property and a property path.

2. The system of claim 1, wherein the tabular navigation element further comprises a table whose data in each column and row are retrieved from the graph database and that filters the data stored in the graph database.

3. The system of claim 2, wherein the graph editor component uses a least common subsumer process to remove redundancy and clarify one or more trees within one or more tables in the tabular navigation element.

4. A system, comprising:
a computer system having a processor, memory and a graph database, the graph database having at least one graph having a plurality of nodes and an interrelationship between each node is represented as a triple that includes a subject, a predicate, and an object, wherein the predicate in each triple represents a property type that connects one node represented as the subject of the triple to another node represented as the object of the triple and the combination of predicate and object represents an attribute of the subject;

a graph editor component coupled to the storage component that selects a graph, selects a view of the graph that is less than the entire graph and configures the selected view of the graph;

the graph editor component configured to browse information in the view of the graph using a tabular navigation element, configured to remove redundancy from the view of the graph in the tabular navigation element and configured to change information in the graph using the view; and wherein the tabular navigation element comprises a table that shows triples stored in the graph by filtering for subjects that are subclasses of a specified class, and for each of those subjects, showing its objects using one or more of a property and a property path that are each represented by a row header, with the objects filtered in the table cells within each row, from left to right, so that each individual row shows objects with the same subject or superclass of objects with the same subject and the graph editor component uses a remove roll-up upon expansion process to further remove redundancy to the right of any roll-up cell that is expanded to show its subclasses in cells below it, by changing a filter for the cells to its right in its row so that the filter includes only objects with the same subject as the expanded cell and no longer includes objects with the same subject as subclasses of the expanded cell.

5. The system of claim 1, wherein the graph editor component sets a default superclass for one of a property and a property path so that a new entry in the tabular navigation element is classified in the graph.

6. The system of claim 1, wherein the graph editor component sets a default for one of a property and a property path, wherein the default is one of a private default and a public default.

7. The system of claim 6, wherein the graph editor component sets a private default and a public default for one of a property and a property path.

8. The system of claim 5, wherein the graph editor component prioritizes a default superclass when an entry is made for a property path.

9. A system, comprising:
a computer system having a processor, memory and a graph database, the graph database having at least one graph having a plurality of nodes and an interrelationship between each node is represented as a triple that includes a subject, a predicate, and an object, wherein the predicate in each triple represents a property type that connects one node represented as the subject of the triple to another node represented as the object of the triple and the combination of predicate and object represents an attribute of the subject;

a graph editor component coupled to the storage component that selects a graph, selects a view of the graph that is less than the entire graph and configures the selected view of the graph; the graph editor component configured to browse information in the view of the graph using a tabular navigation element, configured to remove redundancy from the view of the graph in the tabular navigation element and configured to change information in the graph using the view; and wherein the tabular navigation element is a table that shows triples stored in the graph by filtering for subjects that are subclasses of a specified class, and for each of those subjects, showing its objects using one or more of a property and a property path that are each represented by a row header, with objects filtered in the table cells within each row, from left to right, so that each individual row shows objects with the same subject or superclass of objects with the same subject and the graph editor component uses an inferred class creation process to enable roll-up and expansion using another property instead of subsumption, wherein the user defines an inferred class as a class of nodes that share an attribute specified by the user, and when the user expands the inferred class to show its subclasses, the graph editor automatically creates one or more inferred subclasses, each subclass described by an attribute and each including fewer of the nodes that share the attribute that defines the expanded inferred class, and the graph editor component displays the inferred subclasses to the user unless there are no inferred subclasses subsuming more than one of the nodes that are included in the expanded inferred class and displays any nodes that are subsumed by the expanded inferred class but are not subsumed by the same automatically-created inferred subclass as another node that was subsumed by the expanded inferred class.

10. The system of claim 1, wherein the graph editor component changes a cardinality of one of a property and a property path and automatically adds a subscript to distinguish one or more different versions of one of the property and the property path.

11. A system, comprising:
a computer system having a processor, memory and a graph database, the graph database having at least one graph having a plurality of nodes and an interrelationship between each node is represented as a triple that includes a subject, a predicate, and an object, wherein the predicate in each triple represents a property type that connects one node represented as the subject of the triple to another node represented as the object of the triple and the combination of predicate and object represents an attribute of the subject;
a graph editor component coupled to the storage component that selects a graph, selects a view of the graph that is less than the entire graph and configures the selected view of the graph;
the graph editor component configured to browse information in the view of the graph using a tabular navigation element, configured to remove redundancy from the view of the graph in the tabular navigation element and configured to change information in the graph using the view; and
wherein the tabular navigation element is a table that shows triples stored in the graph by filtering for subjects that are subclasses of a specified class, and for each of those subjects, showing its objects using one or more of a property and a property path that are each represented by a row header, with the objects filtered in the table cells within each row, from left to right, so that each individual row shows objects with the same subject or superclass of objects with the same subject and the graph editor component identifies a distinction between a plurality of row headers with the same property path but with different instances of one or more of the properties in the property path and uses the distinction when filtering the objects of these property paths, regarding the different instances of the same property instead as different properties when searching for a common subject.

12. The system of claim 1, wherein the graph editor component further comprises a filter tree user interface to switch between one of selecting a class, selecting all subclasses, unselecting all subclasses and unselecting the class.

13. The system of claim 1 further comprising a backend system that incorporates the storage component and the graph editor component.

14. The system of claim 13 further comprising one or more computing devices that interact with the graph editor component.

15. The system of claim 1, wherein the graph database uses RDF.

16. The system of claim 1, wherein the storage component further comprises a database server and wherein the graph editor component further comprises an application server.

17. A method comprising:
selecting, by a graph editor component, a graph from a graph database, the graph database having at least one graph having a plurality of nodes and an interrelationship between each node is represented as a triple that includes a subject, a predicate, and an object, wherein the predicate in each triple represents a property type that connects one node represented as the subject of the triple to another node represented as the object of the triple and the combination of predicate and object represents an attribute of the subject;
selecting, by the graph editor component, a view of the graph that is less than the entire graph and configuring the selected view of the graph;
browsing, by the graph editor component, the view of the graph using a tabular navigation element, the tabular navigation element comprises a table that shows triples stored in the graph by filtering for subjects that are subclasses of a specified class, and for each of those subjects, showing its objects using one or more of a property and a property path that are each represented by a row header, with the objects filtered in the table cells within each row, from left to right, so that each individual row shows objects with the same subject or superclass of objects with the same subject;
removing, by the graph editor component, redundancy from the view of the graph in the tabular navigation element;
changing, by the graph editor component, information in the graph using the view; and
disambiguate entries in table cells by searching for one or more nodes in the graph with a greatest number of attributes that match the added attributes represented by each cell entry as an object and its row header as the corresponding one of a property and a property path.

18. The method of claim 17, wherein the tabular navigation element further comprises a table whose data in each column and row are retrieved from the graph database and that filters the data stored in the graph database.

19. The method of claim 18 further comprising removing redundancy in one or more trees in the tree table navigation using a least common subsumer process to clarify one or more trees within one or more tables in the tabular navigation element.

20. A method comprising:
selecting, by a graph editor component, a graph from a graph database, the graph database having at least one graph having a plurality of nodes and an interrelationship between each node is represented as a triple that includes a subject, a predicate, and an object, wherein the predicate in each triple represents a property type that connects one node represented as the subject of the triple to another node represented as the object of the triple and the combination of predicate and object represents an attribute of the subject;
selecting, by the graph editor component, a view of the graph that is less than the entire graph and configuring the selected view of the graph;
browsing, by the graph editor component, the view of the graph using a tabular navigation element comprising a table that shows triples stored in the graph by filtering for subjects that are subclasses of a specified class, and for each of those subjects, showing its objects using one or more of a property and a property path that are each represented by a row header, with the objects filtered in the table cells within each row, from left to right, so that each individual row shows objects with the same subject or superclass of objects with the same subject;
removing, by the graph editor component, redundancy from the view of the graph in the tabular navigation element;
changing, by the graph editor component, information in the graph using the view; and using a remove roll-up upon expansion process further remove redundancy to the right of any roll-up cell that is expanded to show its subclasses in cells below it, by changing a filter for the cells to its right in its row so that the filter includes only objects with the same subject as the expanded cell and no longer includes objects with the same subject as subclasses of the expanded cell.

21. The method of claim 17 further comprising setting a default superclass for one of a property and a property path so that a new entry in the tabular navigation element is classified in the graph.

22. The method of claim 17 further comprising setting a default for one of a property and a property path, wherein the default is one of a private default and a public default.

23. The method of claim 22 further comprising setting a private default and a public default for one of a property and a property path.

24. The method of claim 21 further comprising prioritizing a default superclass when an entry is made for a property path.

25. A method comprising:
selecting, by a graph editor component, a graph from a graph database, the graph database having at least one graph having a plurality of nodes and an interrelationship between each node is represented as a triple that includes a subject, a predicate, and an object, wherein the predicate in each triple represents a property type that connects one node represented as the subject of the triple to another node represented as the object of the triple and the combination of predicate and object represents an attribute of the subject;
selecting, by the graph editor component, a view of the graph that is less than the entire graph and configuring the selected view of the graph;
browsing, by the graph editor component, the view of the graph using a tabular navigation element comprising a table that shows triples stored in the graph by filtering for subjects that are subclasses of a specified class, and for each of those subjects, showing its objects using one or more of a property and a property path that are each represented by a row header, with objects filtered in the table cells within each row, from left to right, so that each individual row shows objects with the same subject or superclass of objects with the same subject;
removing, by the graph editor component, redundancy from the view of the graph in the tabular navigation element;
changing, by the graph editor component, information in the graph using the view; and
creating an inferred class to enable roll-up and expansion using another property instead of subsumption, wherein the user defines an inferred class as a class of nodes that share an attribute specified by the user, and when the user expands the inferred class to show its subclasses, the graph editor automatically creates one or more inferred subclasses, each subclass described by an attribute and each including fewer of the nodes that share the attribute that defines the expanded inferred class, and the graph editor component displays the inferred subclasses to the user unless there are no inferred subclasses subsuming more than one of the nodes that are included in the expanded inferred class and displays any nodes that are subsumed by the expanded inferred class but are not subsumed by the same automatically-created inferred subclass as another node that was subsumed by the expanded inferred class.

26. The method of claim 21 further comprising changing a cardinality of one of a property and a property path and automatically adding a subscript to distinguish one or more different versions of one of the property and the property path.

27. A method comprising:
selecting, by a graph editor component, a graph from a graph database, the graph database having at least one graph having a plurality of nodes and an interrelationship between each node is represented as a triple that includes a subject, a predicate, and an object, wherein the predicate in each triple represents a property type that connects one node represented as the subject of the triple to another node represented as the object of the triple and the combination of predicate and object represents an attribute of the subject;
selecting, by the graph editor component, a view of the graph that is less than the entire graph and configuring the selected view of the graph;
browsing, by the graph editor component, the view of the graph using a tabular navigation element comprising a table that shows triples stored in the graph by filtering for subjects that are subclasses of a specified class, and for each of those subjects, showing its objects using one or more of a property and a property path that are each represented by a row header, with the objects filtered in the table cells within each row, from left to right, so that each individual row shows objects with the same subject or superclass of objects with the same subject;
removing, by the graph editor component, redundancy from the view of the graph in the tabular navigation element;
changing, by the graph editor component, information in the graph using the view; and
identifying a distinction between a plurality of row headers with the same property path but with different instances of one or more of the properties in the property path and using the distinction when filtering the objects of these property paths, regarding the different instances of the same property instead as different properties when searching for a common subject.

28. The method of claim 21 further comprising switching between one of selecting a class, selecting all subclasses, unselecting all subclasses and unselecting the class.

29. The method of claim 21, wherein the graph database uses RDF.

30. The method of claim 21, wherein changing information in the graph further comprises one of adding information in the graph, removing information from the graph and editing information in the graph.

31. The method of claim 17, wherein selecting the graph further comprises selecting one of a graph stored in the graph database and a blank graph.

32. The method of claim 17, wherein selecting the view of the graph further comprises selecting one of an existing view of the and a blank view.

* * * * *